United States Patent [19]

Ishida et al.

[11] Patent Number: 5,243,375

[45] Date of Patent: * Sep. 7, 1993

[54] AUTOMATIC FOCUS ADJUSTING DEVICE FOR ADJUSTING THE FOCUS OF THE MAIN OBJECT TO BE PHOTOGRAPHED

[75] Inventors: Tokuji Ishida; Toshio Norita; Hiroshi Ootsuka, all of Osaka, Japan

[73] Assignee: Minolta Camera Kabushiki Kaisha, Osaka, Japan

[*] Notice: The portion of the term of this patent subsequent to Oct. 1, 2008 has been disclaimed.

[21] Appl. No.: 738,237

[22] Filed: Jul. 30, 1991

Related U.S. Application Data

[60] Division of Ser. No. 404,576, Sep. 8, 1989, Pat. No. 5,053,801, which is a continuation of Ser. No. 196,254, May 20, 1988, abandoned.

[30] Foreign Application Priority Data

May 21, 1987 [JP] Japan .................. 62-125189

[51] Int. Cl.$^5$ .................. G03B 13/36; G01J 1/20
[52] U.S. Cl. .................. 354/402; 250/201.2
[58] Field of Search .............. 354/402, 406, 407, 408; 250/201.2, 201.7, 201.8

[56] References Cited

U.S. PATENT DOCUMENTS

| | | | |
|---|---|---|---|
| Re. 32,376 | 3/1987 | Fukuhara et al. | 354/432 |
| 4,083,056 | 4/1978 | Nakamura et al. | 354/25 |
| 4,284,335 | 8/1981 | Takemae et al. | 354/25 |
| 4,341,953 | 7/1982 | Sakai et al. | 250/204 |
| 4,373,791 | 2/1983 | Araki | 354/25 |
| 4,387,975 | 6/1983 | Araki | 354/25 |
| 4,415,246 | 11/1983 | Karasaki et al. | 354/25 |
| 4,416,523 | 11/1983 | Kawabata | 354/25 |
| 4,423,936 | 1/1984 | Johnson | 354/403 |
| 4,560,863 | 12/1985 | Matsumura et al. | 250/201 |
| 4,563,576 | 1/1986 | Matsumura et al. | 250/204 |
| 4,575,211 | 3/1986 | Matsumura et al. | 354/403 |
| 4,589,031 | 5/1986 | Tsuji | 358/227 |
| 4,614,418 | 9/1986 | Ishizaki et al. | 354/407 |
| 4,614,975 | 9/1986 | Kaite | 358/227 |
| 4,636,624 | 1/1987 | Ishida et al. | 250/201 |
| 4,650,309 | 3/1987 | Ishida et al. | 354/408 |
| 4,659,917 | 4/1987 | Suzuki et al. | 250/201 |
| 4,664,495 | 5/1987 | Alyfuku et al. | 354/430 |
| 4,681,419 | 7/1987 | Sakai et al. | 354/402 |
| 4,687,917 | 8/1987 | Kusaka et al. | 250/201 |
| 4,716,434 | 12/1987 | Taniguchi et al. | 354/408 |
| 4,743,931 | 5/1988 | Matsuzaki et al. | 354/400 |
| 4,764,786 | 8/1988 | Tamura et al. | 354/403 |
| 4,766,302 | 8/1988 | Ishida et al. | 250/201 |
| 4,768,052 | 8/1988 | Hamada et al. | 354/402 |
| 4,768,054 | 8/1988 | Norita et al. | 354/408 |
| 4,857,720 | 8/1989 | Karasaki | 250/201 |
| 4,904,854 | 2/1990 | Ishida et al. | 250/201 |
| 4,905,032 | 2/1990 | Ishida et al. | 354/402 |
| 4,994,841 | 2/1991 | Ishida et al. | 354/402 |
| 5,053,801 | 10/1991 | Ishida et al. | 354/402 |

FOREIGN PATENT DOCUMENTS

58-49844 11/1958 Japan .
58-224318 12/1983 Japan .

(List continued on next page.)

Primary Examiner—W. B. Perkey
Attorney, Agent, or Firm—Burns, Doane, Swecker & Mathis

[57] ABSTRACT

An automatic focus adjusting device detects focus condition respectively of a plurality of areas of a scene to be photographed to calculate respective focus adjusting data, and automatically adjusts the focus of an objective lens on an object in the scene based on the focus adjusting data. And the automatic focus adjusting device decides a focus adjusting data from the plurality of focus adjusting data based on an image magnification data representing the size of the object relative to the scene, a focal length of the objective lens or an object distance to automatically adjust the focus.

12 Claims, 19 Drawing Sheets

FOREIGN PATENT DOCUMENTS

| | | |
|---|---|---|
| 59-30510 | 2/1984 | Japan . |
| 59-48719 | 3/1984 | Japan . |
| 59-67505 | 4/1984 | Japan . |
| 59-107311 | 6/1984 | Japan . |
| 59-123822 | 7/1984 | Japan . |
| 59-129810 | 7/1984 | Japan . |
| 59-146032 | 8/1984 | Japan . |
| 60-14211 | 1/1985 | Japan . |
| 60-37509 | 2/1985 | Japan . |
| 60-101514 | 6/1985 | Japan . |
| 60-120675 | 6/1985 | Japan . |
| 60-144711 | 7/1985 | Japan . |
| 60-183879 | 9/1985 | Japan . |
| 60-249477 | 12/1985 | Japan . |
| 60-250318 | 12/1985 | Japan . |
| 61-12177 | 1/1986 | Japan . |
| 61-18271 | 1/1986 | Japan . |
| 61-28914 | 2/1986 | Japan . |
| 61-29813 | 2/1986 | Japan . |
| 61-34515 | 2/1986 | Japan . |
| 61-53614 | 3/1986 | Japan . |
| 61-55618 | 3/1986 | Japan . |
| 61-70407 | 4/1986 | Japan . |
| 62-14015 | 1/1987 | Japan . |
| 62-67971 | 3/1987 | Japan . |
| 62-95511 | 5/1987 | Japan . |
| 62-138808 | 6/1987 | Japan . |
| 62-166309 | 7/1987 | Japan . |
| 62-173413 | 7/1987 | Japan . |
| 62-189415 | 8/1987 | Japan . |
| 62-204247 | 9/1987 | Japan . |
| 63-10135 | 1/1988 | Japan . |
| 63-10136 | 1/1988 | Japan . | camera

AUTOMATIC FOCUS ADJUSTING DEVICE FOR ADJUSTING THE FOCUS OF THE MAIN OBJECT TO BE PHOTOGRAPHED

This application is a divisional, of application Ser. No. 07/404,576, filed Sep. 8, 1989, now U.S. Pat. No. 5,053,801 which is a continuation of application Ser. No. 07/196,254 filed May 20, 1988, now abandoned.

BACKGROUND OF THE INVENTION AND RELATED ART STATEMENT

The present invention relates to an automatic focus adjusting device having a plurality of focus detecting areas which is put to practical use as a single lens reflex camera or a video camera having an intelligent AF function capable of distinguishing an object in a scene to be photographed and automatically adjusting focus on the object.

In a conventional automatic focus adjusting device having a plurality of focus detecting areas, it has been proposed that object distance data are obtained relating to a plurality of focus detecting areas. The focus is adjusted on an object nearest to the photographer by driving the lens based on the rearmost, namely, the nearest object distance data, (see Japanese Laid-Open Patent Publication (Tokkaisho) No. 59-146028)

In an automatic focus adjusting device having a plurality of focus detecting areas, it is a problem how to determine the defocus amount for driving lens from the defocus amounts obtained relating to the plurality of focus detecting areas in order to focus on the main object to be photographed. In the Japanese Laid-Open Patent Publication No. 59-146028, the lens is driven based on the defocus amount of the rearmost or nearest object on the assumption that the object nearest to the photographer is the main object to be photographed. However, the object nearest to the photographer is not always the main object to be photographed. Therefore, disadvantageously, if the main object to be photographed is not the one nearest to the photographer, the main object cannot be focused.

On the other hand, in Japanese Laid-Open Patent Publication No. 61-279829, in a light measuring device for a camera in which light is measured by dividing an angle of view into a plurality of areas, it is proposed that the computing formula of the light measuring output is changed with the image magnification. However, this prior art relates to a light measuring device, and light measuring data and distance measuring data are of quite different character, and the ways of evaluating these data are also completely different. Consequently, this art has not proposed any suggestion to the solution of the technical problem of deciding defocus amount in an automatic focus adjusting device having a plurality of focus detecting areas.

In order to solve this technical problem, the inventors, have actually taken numerous sheets of photographs while changing a variety of photographing conditions such as the focal length of an objective lens, the a diaphragm aperture, the object distances and their distribution and the like, taking account of a variety of photographing circumstances, and statistically processed and examined the obtained data. As a result, the inventors have found that if the image magnification of an object in the scene, especially an object in the center of the scene is high, the object in the center of the scene is in many cases the main object to be photographed. On the contrary, if the image magnification thereof is low, the object nearest to the photographer is in many cases the main object to be photographed.

The present invention is based on such findings, and an object of the present invention is to provide an automatic focus adjusting device in which the focus is adjusted on the main object to be photographed at a high probability by selecting an argorithm for deciding a defocus amount for driving a lens out of defocus amounts relating to a plurality of areas of a scene in accordance with an image magnification.

SUMMARY OF THE INVENTION

As mentioned above, according to the present invention, an automatic focus adjusting device has a means for calculating image magnification data indicating the size of an image in a scene and a means for calculating focus detecting data relating to a plurality of areas of the scene. A single focus adjusting data is decided based on the image magnification data and the focus detecting data. Consequently, according to the present invention, an automatic focus adjusting device can be provided in which a main object to be photographed can be focused on at a higher probability than in a conventional device always using a predeter mined focus adjusting data.

DETAILED DESCRIPTION OF PREFERRED EMBODIMENT OF THE INVENTION

Figure 1:
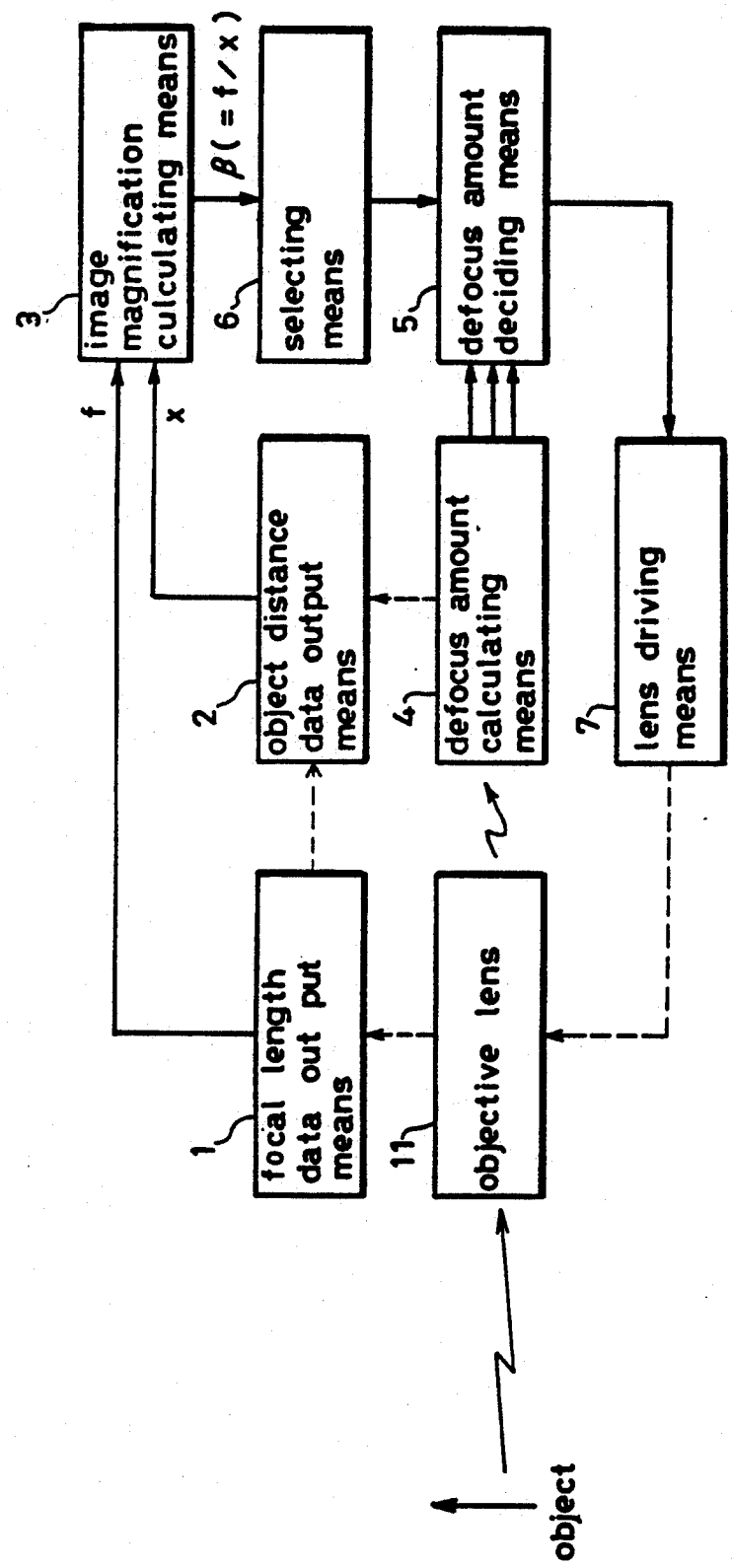
FIG. 1 is schematic construction view of the present invention.

For the purpose of achieving the abovementioned objects, an automatic focus adjusting device according to the present invention comprises, as shown in FIG. 1, an objective lens 11, a focal length data output means 1 for producing data on a focal length f of the objective lens 11, an object distance data output means 2 for producing data on a distance x from the objective lens to an object to be photographed, an image magnification calculating means 3 for calculating an image magnification $\beta$ based on the data output on the focal length f from the focal length data output means 1 and the data output on the object distance x from the object distance data output means 2, a defocus amount calculating means 4 for calculating defocus amounts relating to a plurality of areas of a scene, a defocus amount deciding means 5 having a plurality of defocus amount deciding algorithms for deciding a defocus amount based on the defocus amounts obtained by the defocus amount calculating means 4, a selecting means 6 for selecting a defocus amount deciding algorithm of the defocus amount deciding means 5 in accordance with an image magnification $\beta$ calculated by the image magnification calculating means 3, and a lens driving means 7 for driving a focus adjusting lens of the objective lens 11 based on the defocus amount decided by the defocus amount deciding means 5 using the defocus amount deciding algorithm selected by the selecting means 6.

FIG. 1 is a block diagram for functionally explaining a construction of the present invention, and in the embodiments described later, all or a part of the means 1 to 7 are realized by a program of a microcomputer.

Effects of the present invention will be now described in the following with reference to FIG. 1. The focal length data output means 1 issues data on the focal length f of the objective lens 11. And the object distance data output means 2 produces data on the distance x from the objective lens 11 to an object. The image magnification calculating means 3 calculates an image magnification $\beta$ based on data on a focal length f issued from the focal length data output means 1 and data on the object distance x issued from the object distance information output means 2.

The defocus amount calculating means 4 calculates defocus amounts of a plurality of areas of a scene.

The defocus amount deciding means 5 decides a defocus amount based on a defocus amount calculated by the defocus amount calculating means 4. The defocus amount deciding means 5 is provided with a plurality of defocus amount deciding algorithms, but a defocus amount deciding algorithm is selected by the selecting means 6 according to an image magnification $\beta$ calculated by the image magnification calculating means 3.

The lens driving means 7 drives a focus adjusting lens of the camera lens 11 according to a defocus amount decided by the defocus amount deciding means 5 using a defocus amount deciding algrorithm.

According to the present invention, as mentioned above, for driving the lens, a defocus amount is decided based on a defocus amount deciding algorithm selected according to an image magnification $\beta$ from defocus amounts of plurality of areas of a scene. Consequently, an optimum defocus amount deciding algrorithm can be used for an image magnification, and the probability of adjusting the focus of the lens on an object becomes higher than in a conventional automatic focus adjusting system in which the defocus amount is decided by a single algorithm.

Figure 2:
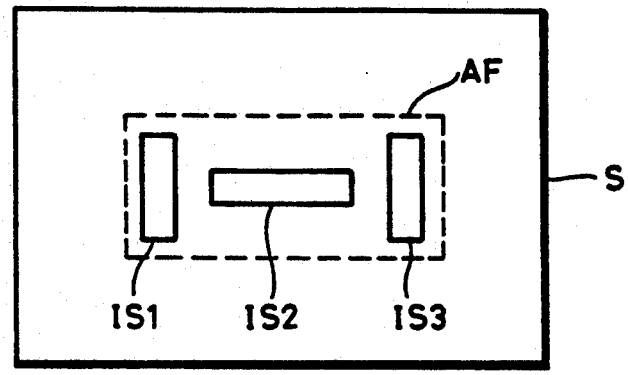
FIG. 2 is a view showing a display in a finder of an automatic focus adjusting device of an embodiment of the present invention.

FIG. 2 shows focus detecting areas in a scene of a camera having an automatic focus adjusting device according to the present invention and a display in a finder thereof. In this embodiment focus detection can be performed relating to objects within three areas IS1, IS2, IS3, (hereinafter referred to as the first island, the second island and the third island) in the scene defined by solid line in the center of the scene. In this figure, a rectangular frame AF shown with dotted line is provided in order to indicate focus detectable area to users. An indicator Lb outside the scene S indicates a focus detecting state and it is lit up when object is in in-focus.

Figure 3:
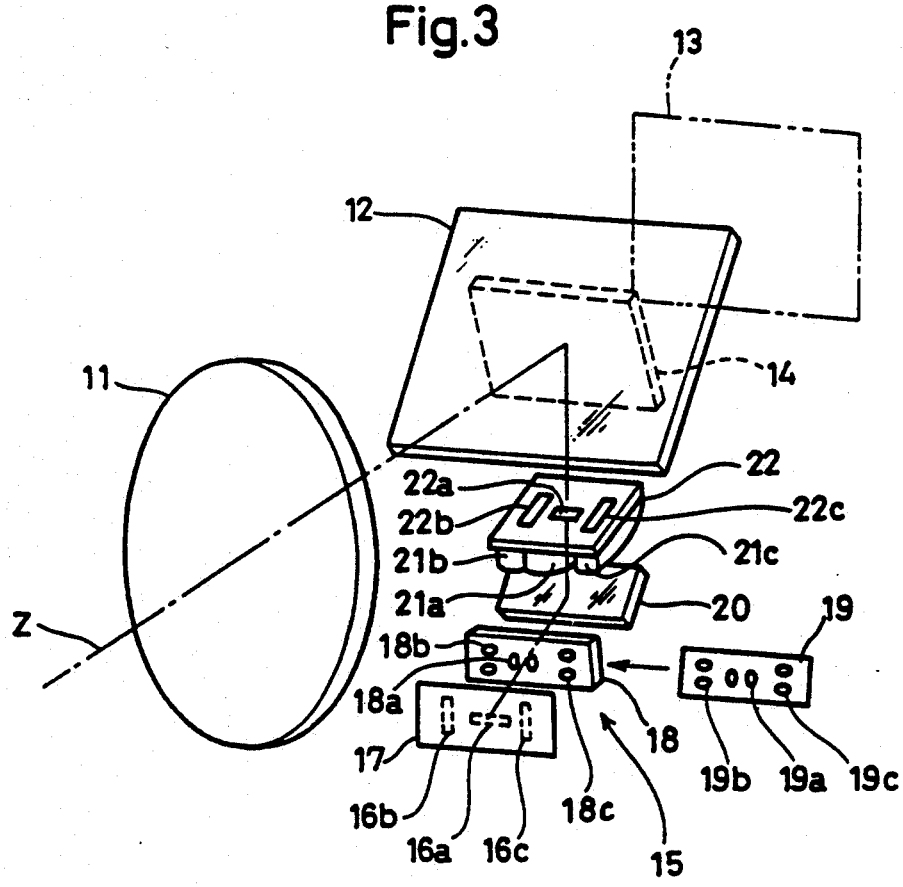
FIG. 3 is a perspective view of a focus detecting optical system used in the automatic focus adjusting device of FIG. 2.

FIG. 3 schematically shows the construction of a multi-point distance measuring module having the abovementioned focus detecting areas. There are shown in this figure, the objective lens 11, a main mirror 12, a film plane 13, a sub-mirror 14 and a focus detecting optical 15. Numeral 22 indicates a field stop having rectangular apertures 22a, 22b, 22c. Further, there are shown condenser lenses 21a, 21b, 21c, a module mirror 20, pairs of senarator lenses 18a, 18b, 18c, and CCD line sensor 16a, 16b, 16c provided on a focal plane 17 of the separator lenses. Numeral 19 indicates a stop mask having circular or elliptical apertures 19a, 19b, 19c. An image of the field of which is defined by the rectangular operture 22a passes through the condenser lens 21a and then projected as two images on the CCD line sensor 16a by means of the aperture 19a and the pairs of separator lenses 18a. The object is judged to be in in-focus when the distance between the two images is a predetermined value. And it is judged that the lens is focused in front of the object when the distance is smaller than the predetermined value and behind the object when it is larger than that. Similarly, images passing through the condenser lenses 21b, 21c, are projected on the CCD line sensor 16b, 16c by means of the rectangular apertures 19b, 19c.

Figure 4A:
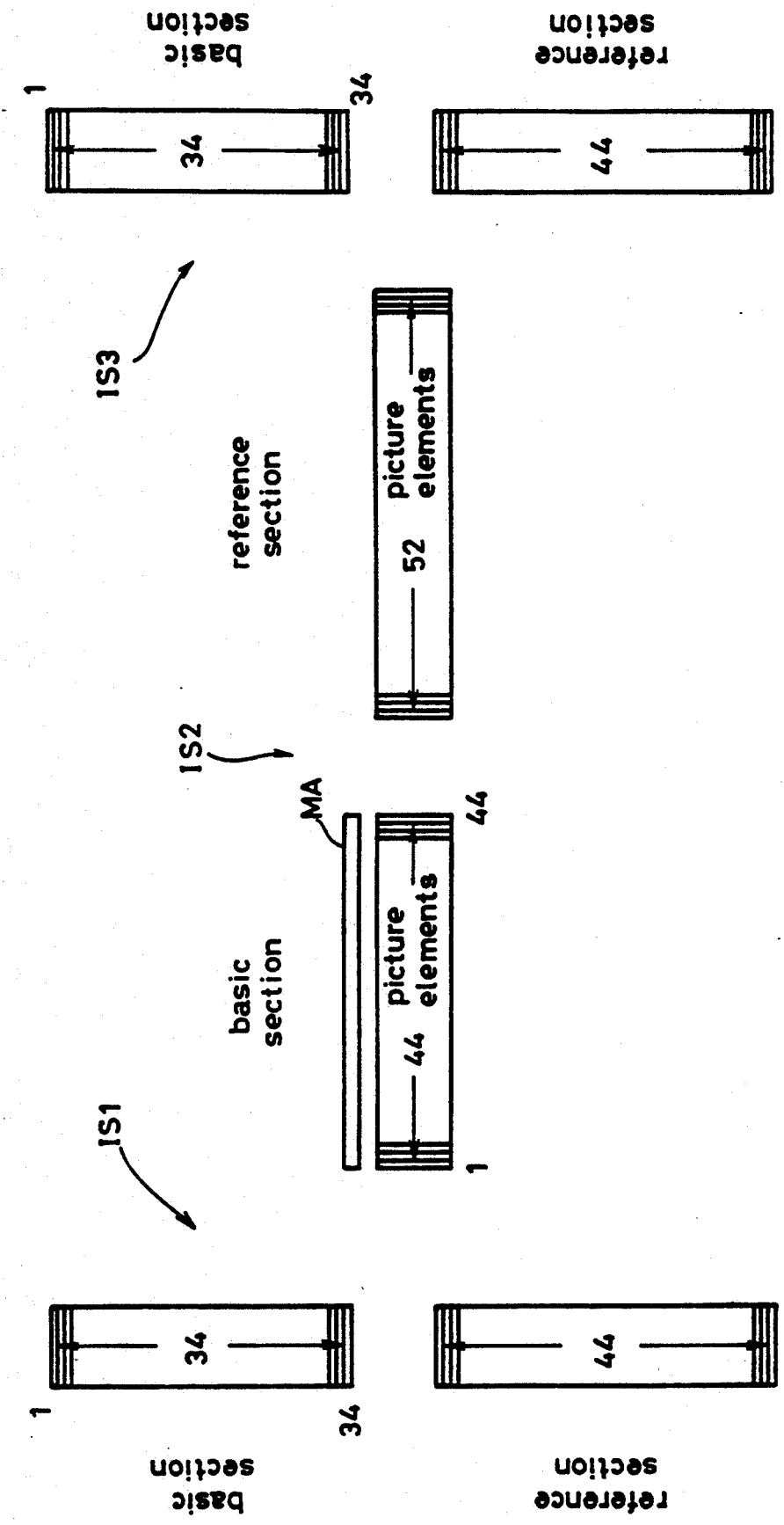
FIGS. 4a, 4b are explanatory views showing details of a CCD line sensor used in the automatic focus adjusting device of FIG. 2.

FIG. 4a shows a light receiving section of the CCD line sensor (which comprises the light receiving section, a storage section and a transfer section) used in the focus detecting device. For each of the islands IS1, IS2, IS3 of FIG. 2, a basic section and a reference section are provided respectively. Further, a monitoring photoelectric element MA for controlling charge accummulation time for the storage section of the CCD line sensor is provided at one longitudinal side of the basic section of the middle island IS2. The numbers (X, Y) of picture elements of the basic section and the reference section of the islands IS1, IS2, IS3 are (34, 44), (44, 52) and (34, 44) respectively in this order. These are all provided on one chip.

In this embodiment of the focus detecting device, the basic sections of the abovementioned three islands are divided into three blocks, and focus detection is carried out by comparing each block of the basic sections, with all of the reference sections. Among the results of focus detection of each block, data when the lens is focused at the furthest position behind the object is regarded as the focus detecting data of each island. Further, a focus detecting data of a camera is calculated based on the focus detecting data of each island and image magnification data (described later in detail).

Figure 4B:
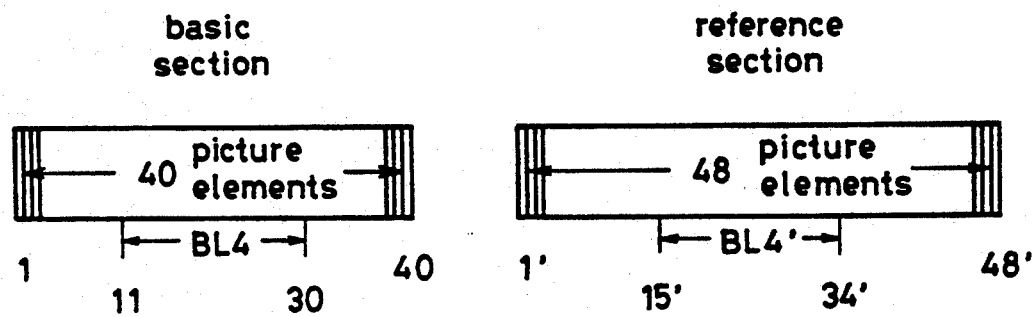
Figure 5:
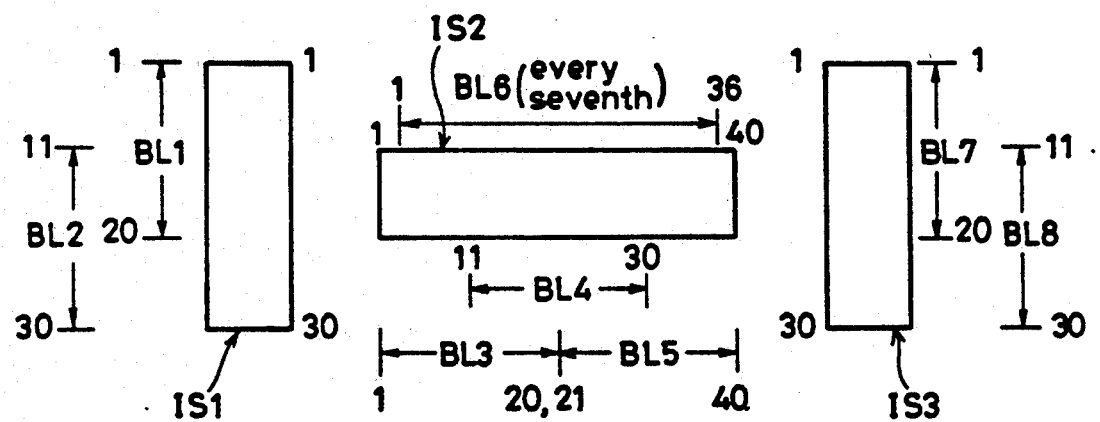
FIG. 5 is an explanatory view showing divided areas of a basic section in the CCD tip of FIG. 4a, 4b.
Figure 6:
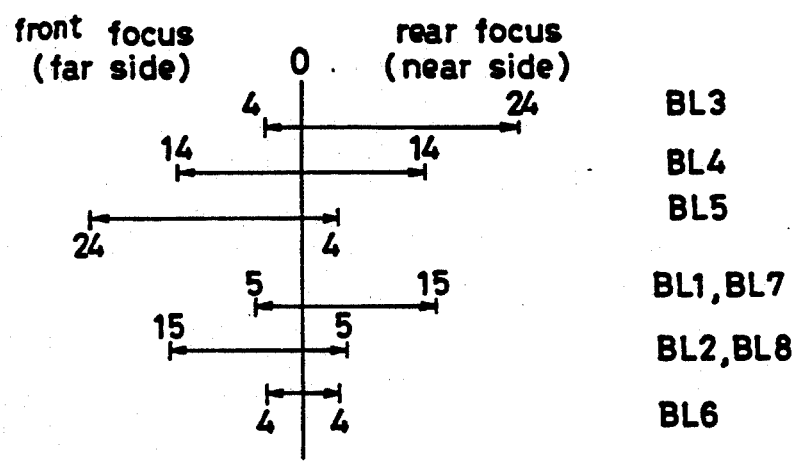
FIG. 6 is an explanatory view showing shift amounts of the divided areas of FIG. 5.

The area to be divided and the defocus area of the divided island are shown in FIGS. 4b, 5, 6. FIG. 5 is an enlarged view of the focus detecting areas in the scene shown in FIG. 2. Each island IS1, IS2, IS3, for focus detection is the area of each basic section shown in FIG. 4a. In FIG. 5, numeral shown relating to each island indicates the number of difference when an every fourth finite-differential data are taken of the picture elements of CCD shown in FIG. 4a (the finite-differential data may be every third or second, and in these cases, the abovementioned numeral changes). Consequently, the numbers (X, Y) of the basic section and the reference section in each island are (30, 40) in the island IS1, (40, 48) in the island IS2, and (30, 40) in the island IS3. Taking of division of each island, in the island IS1, two blocks are formed which are a first block BL1 (1~20), and a second block BL2 (11~30) in accordance with the upper end finite-differential data. In the island IS2, three blocks are formed which are a third block BL3 (1~20), a fourth block BL4 (21~40), and a fifth block BL5 (11~30) in accordance with the left end finite differential data. In the island IS3, two blocks are formed which are a seventh block BL7 (1~20) and an eighth block BL8 (11~30) in accordance with the upper end finite-differential data. Further in this embodiment, in the abovementioned second island IS2, computing for focus detection is carried out by using data the extraction frequency of which is changed for an object of a low frequency, concretely every eighth finite-differential data of the abovementioned data of the picture elements. The numbers of those data are 36 in the basic section and 44 in the reference section which are every eighth finite-differential data of all the data from CCD. If the difference is larger than that abovementioned, the focus detecting device is more advantageous for an area of low frequency, but two times the abovementioned value is supposed. And this block is a sixth block BL6.

In the focus detection using this phase difference detecting system, if the distance between the images of the basic section and the reference section which coincide with each other is larger than a predetermined value, the focus of the lens is behind the object (which is hereinafter referred to as rear-focus) and if the distance is smaller than the value the focus is in front of the object (which is hereinafter referred to as front-focus), and further if it is equal to the value, the object is in focus. Consequently, taking of defocus part in the devided blocks, the block far away from an optical center in the island takes charge of the rear-focus side. FIG. 4b is a view showing the details of the CCD line sensor after the finite-differential data are taken. In FIG. 4b, the basic section and the reference section of the island IS2 are shown. Now, the defocus range of the fourth block BL4 will be described. In this case, the lens is in focus if the image which is from the 15th to 34th from the leftside end (BL4') of the reference section coincides with the image of the fourth block BL4. If the image is more leftside of the reference section with the latter, it is the front-focus state and the greatest defocus data value (hereinafter referred to as defocus pitch) is 14. On the other hand, if the image more rightside of the reference section than shown coincides with the image of the fourth block BL4, the behind-focus state and the greatest defocus pitch is 14. The defocus ranges in the blocks of other islands are similar, and it is shown in FIG. 6. In the third block RL3 the defocus pitch on the front-focus side is 4 while that on the rear-focus side is 24. In the fifth block BL5, the defocus pitch on the front-focus side is 24 while that on the rear-focus side is 4. Taking of the first IS1 and the third island IS3, the defocus pitch on the front-focus side of the first BL1 and the seventh block BL7 is 5 while that on the rear-focus side is 5, and the defocus pitch on the front-focus side of the second BL2 and the eighth block EL8 is 15 while that on the rear focus side is 5. The defocus pitches on the front-focus and the rear-focus sides of the seventh block BL6 are both 4. In the following description, indications of the islands IS1~IS3 and the blocks BL1~BL8 are omitted.

Figure 7:
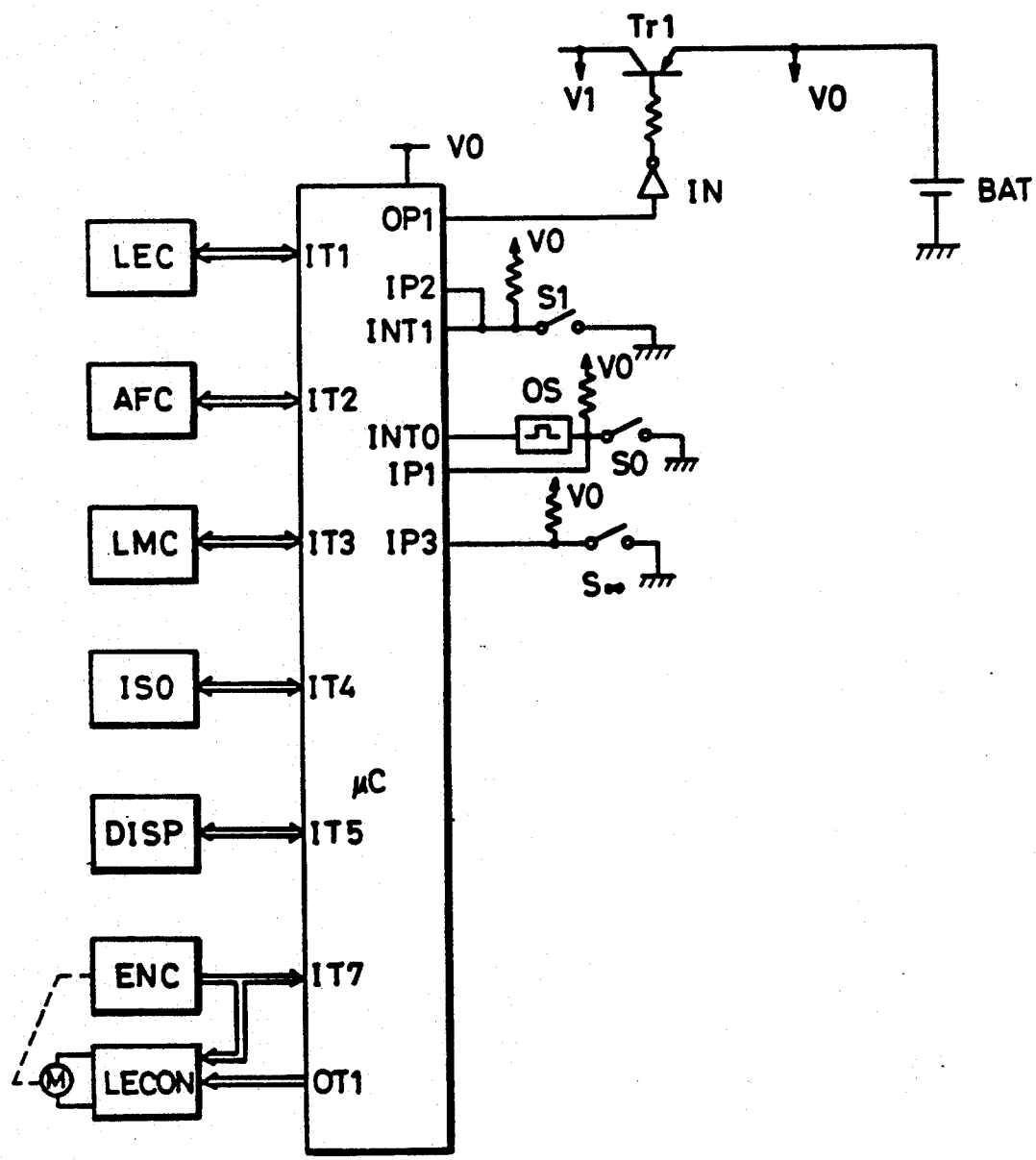
FIG. 7 is a circuit diagram of a control circuit used in the automatic focus adjusting device of FIG. 2.

FIG. 7 is a block diagram of a circuit of a camera.

$\mu$C is a microcomputer for computing the whole sequence of a camera, exposure and focus detection, and LEC is a lens circuit of an interchangeable lens to be mounted on a camera body (not shown) which transmits data characteristic of the interchangeable lens to the camera. AFC is an output circuit including CCD which receives the light passed through the abovementioned lens and converts it to an analog electric signal. AFC converts the abovementioned analog signal to a digital signal and feeds it to the microcomputer $\mu$C.

LMC is a brightness detecting circuit which measures the light passed through the lens and detects the brightness of the object, and feeds a digital signal Bv of the APEX system corresponding to the brightness of the object to the microcomputer $\mu$C. IS0 is a film speed reading circuit which feeds a digital signal Sv of the APEX system corresponding to the film speed to the microcomputer $\mu$C. DISP is a display circuit which displays an exposure data and the focus condition of the lens. ENC is an encoder which detects a rotation amount of a motor M and feeds pulses the number thereof corresponding to the rotation amount of the motor M to a lens control circuit LECON mentioned below. The lens control circuit LECON recives a signal of the rotation amount (number) of the motor and a motor control signal from the microcomputer $\mu$C, drives the motor M based on the signals, receives a signal from the encoder, detects whether the motor is driven by a predetermined amount (rotation amount of the motor M), and controls the stop of the motor M. Microcomputer $\mu$C has thereinside a counter for detecting the lens position, and counts up or counts down the pulse from the encoder under an order made thereinside. Further, at the time of inwardly driving the lens by turning on a belowmentioned main switch S0, the abovementioned counter is reset in accordance with an order thereinside when the lens is driven to the $\infty$ position.

BAT is a source battery which directly feeds electricity to the microcomputer and a belowmentioned switch. Tr1 is a feeding transistor which feeds all the circuits but the microcomputer $\mu$C. S0 is a switch which is turned on and off by the operation the main switch. One-shot circuit 0S generates a pulse by turning on or off of the switch S0. The microcomputer receives this pulse and enters a belowmentioned intruding flow INTO. S$\infty$ is a switch which is turned on when the lens is driven to the $\infty$ position.

Now, the operation of the camera will be described with reference to a flow chart.

Figure 20:
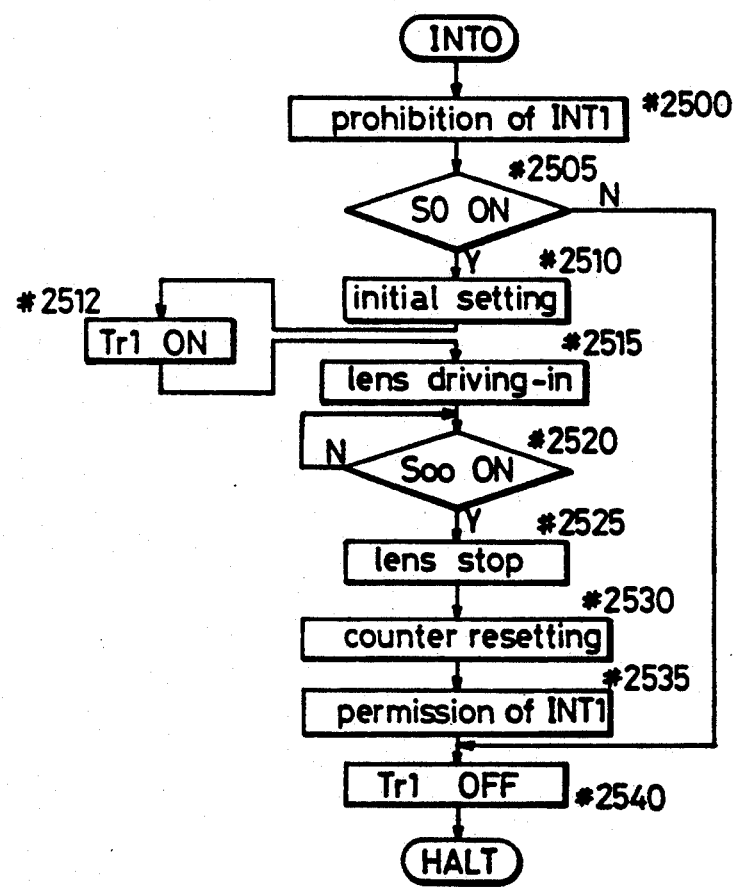

First, the main switch S0 is turned on and a pulse is fed to a intruding input terminal INTO from the one-shot circuit 0S, so that the microcomputer $\mu$C enter a flow chart of intruding INT0 shown in FIG. 20. The microcomputer $\mu$C forbids intruding INT1 caused by the turning-on of a photographic preparation switch S1 and judges by a level of a terminal IP1 whether the intruding is caused by the turning-on of the main switch S0 or by the turning-off thereof (#2500, 2505). When the terminal IP1 is on H level, the intruding is judged to be caused by the turning-off of the main switch S0, and in order to stop the operation of all the circuits, a terminal OP1 is put on the H level, the output of an inverter IN being put on H level, the power supply transistor being turned off, thereby entering in HALT state (un-operated state) (#2540). On the other hand, when the terminal IP1 is on L level, the interruption is judged to be caused by the turning-on of the switch S0, and flags and the output terminals are initially set, the terminal OP1 being put on H level and the feeding transistor Tr1 turned on (#2510, 2512). Then, for controlling the inward driving of the lens, a signal of inward driving of the lens is fed to the lens control circuit LECON (#2515). The lens is inwardly driven to the $\infty$ position and after a wait when a switch S$\infty$ indicating that the lens is driven to the $\infty$ position is turned on, a lens stop signal is issued (#2520, #2525). At the same time, the counter indicating the inward driving amount of the lens from the ∞ position is reset, the interruption by the turning-on of the photographic preparation switch S1 being permitted, the terminal OP1 being put on L level for turning off the power supply transistor Tr1, resulting in HALT state, (#2530~#2540).

S1 is a photographic preparation switch which is turned on by the operation of a release button (not shown). When the switch S1 is turned on, a signal changing H level to L level is fed to the interruption terminal INT1, which is detected by the microcomputer thereby entering the interruption INT1 shown in FIG. 8.

The microcomputer μC initially sets each flag, output port and the like, and put the terminal OP1 on H level (#5, #10) for turning on the transistor Tr1. Then lens data (a focal length data, a diaphragm aperture value, a coefficient for converting the defocus amount to a pulse number for the lens driving, etc) are received (#15). Then, the focus detecting data output circuit AFC is let to integrate. After the integration, the data from the focus detecting data output circuit AFC are received, and stored in a memory as an every fourth differential data. Then, the defocus amount of each island is calculated and the exposure is calculated to display the focus condition and the exposure data (#30, #35, #40). A defocus amount for the lens driving is calculated from the abovementioned defocus amount of each island, and based on this, the lens is driven (#45). Then, the switch S1 is judged to be on or off by the fact that the terminal IP2 is on L level or not. When on L level, the switch S1 is judged to be on, the program is returned to step #15 and the flow from step #15 is repeated (#50). On the other hand, when the terminal IP2 is on H level, the switch S1 is judged to be off and the terminal OP1 is put on L level to stop the operation of the microcomputer μC (#55).

Figure 8:
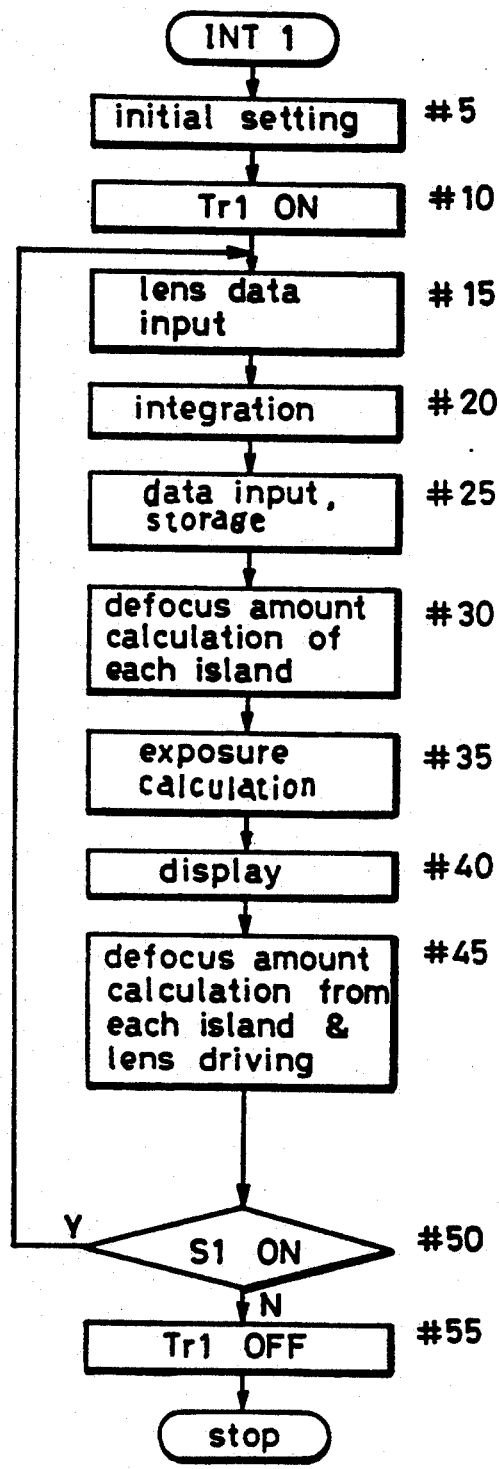
FIGS. 8 to 20 are flow charts of the automatic focus adjustment carried out by the circuit of FIG. 7.
Figure 9:
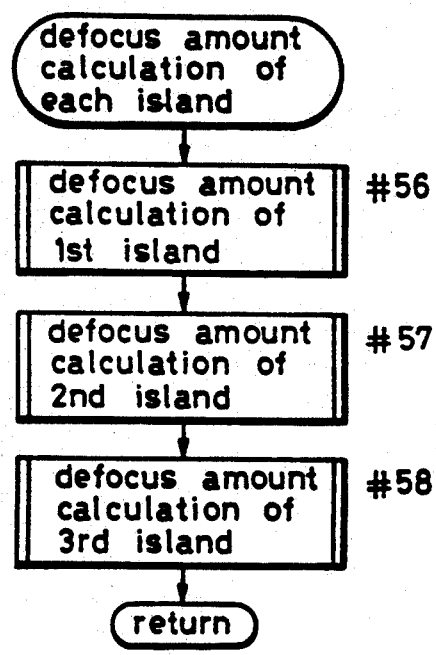
Figure 10:
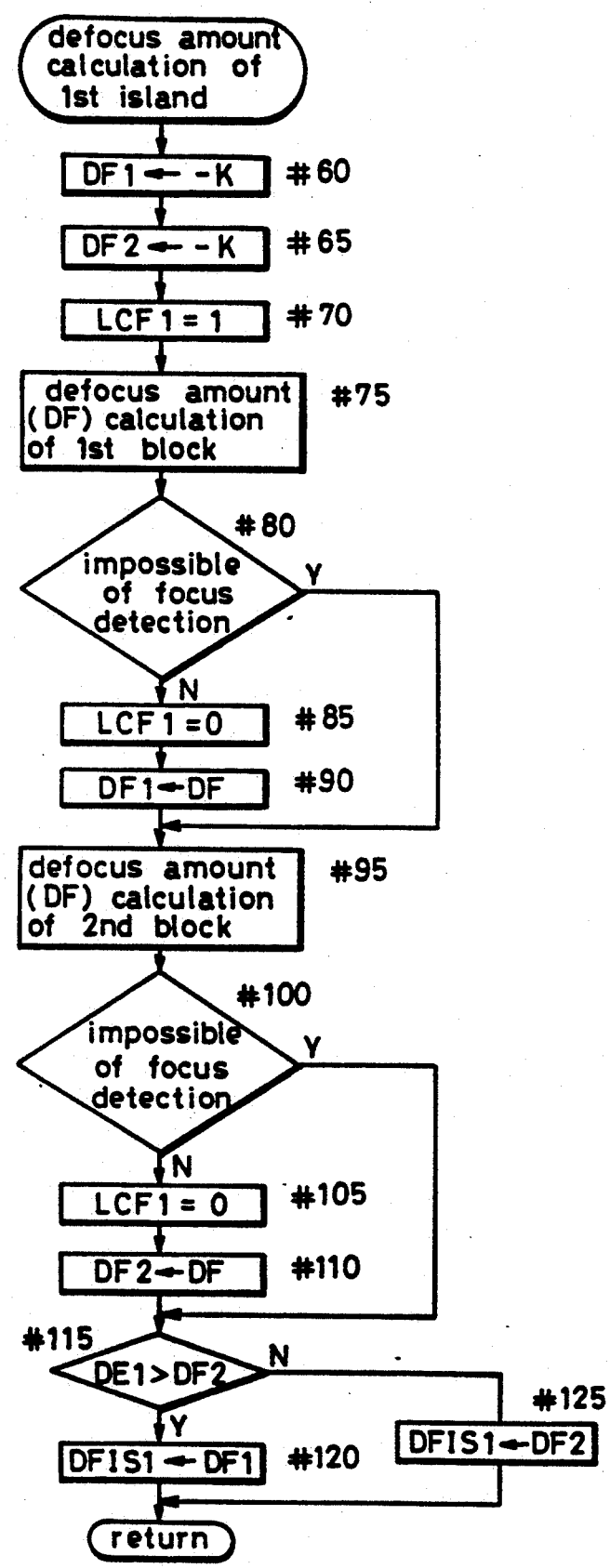

Now, a subroutine of defocus amount calculation of each island (#30) shown in FIG. 8 is shown in FIG. 9 and the figures subsequent thereto. FIG. 9 shows the defocus amounts of the first, the second and the third island are calculated in this order. Flow chart of the defocus amount calculation of each island are shown in FIG. 10, 11, 12. FIG. 10 a flow chart of the defocus amount calculation of the first island. The first island is, as abovementioned, divided into two blocks i.e, the first and the second blocks, and as each of variables DF1, DF2 for storing the defocus amount of the two blocks, a predetermined value −K is set respectively (#60, #65). This is a value of a front-focus state impossible in these blocks, and is used as the defocus amount when the focus detection is impossible. Then, a flag indicating the impossibility of the focus detection of the first island (hereinafter referred to as LC) is set (#70). Then the detection of the focus condition and the defocus amount calculation of the first block is carried out, to judge from the results whether the focus detection is impossible or not, and when impossible, the program advances to step #95 (#75, #80). On the contrary, when the focus detection is possible, LC flag LCF1 is reset and the obtained defocus amount DF is regarded as the defocus amount DF1 of the first block (#85, #90).

Next, the detection of the focus condition and the defocus amount calculation of the second block is carried out, to judge from the results whether the focus detection is impossible or not, and when impossible, the program advances to step #115 (#95, #100). On the contrary, when the focus detection is possible, the LC flag LCF1 of the first island is reset (#105), the obtained defocus amount DF is regarded as the defocus amount DF2 of the second block, and the program advance to step #115. At step #115, largeness or smallness of the defocus amount (including the direction, minus in the case of front-focus state and plus in the case of rear-focus state) is judged, and the larger one of the defocus amounts DF1, DF2, that is, the defocus amount of the object closer to the camera is regarded as the defocus amount DFIS of the first island. In concrete, when the defocus amount DF1 of the first island is larger, it is regarded as the defocus amount DFIS1 of the first island, and when the defocus amount DF2 of the second block is larger, it is regarded as the defocus amount DFIS1 (#120, #125). The program of the microcomputer μC is returned to the flow of FIG. 9.

Figure 11:
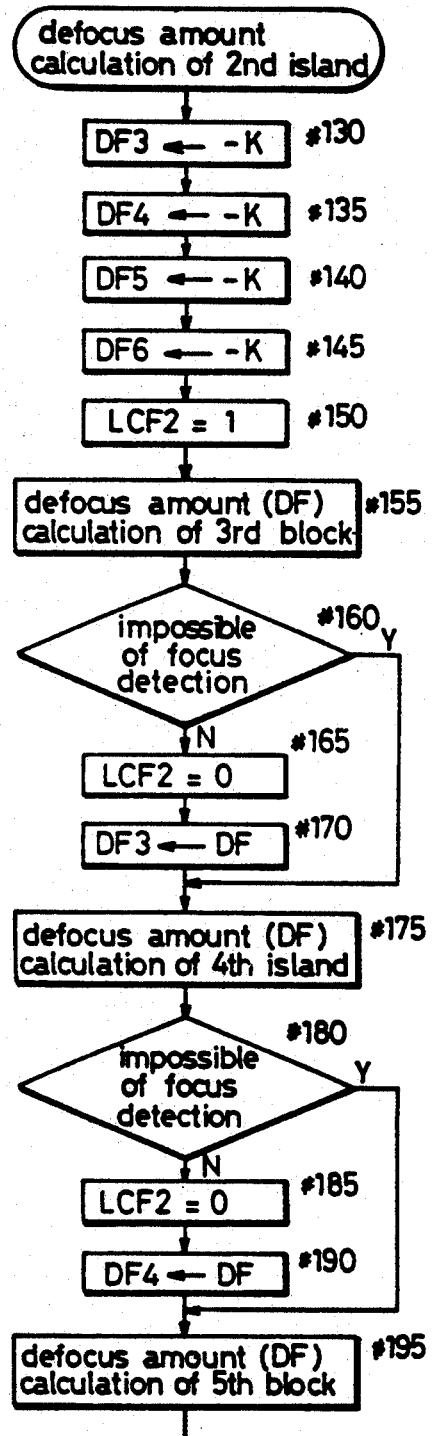
Figure 11:
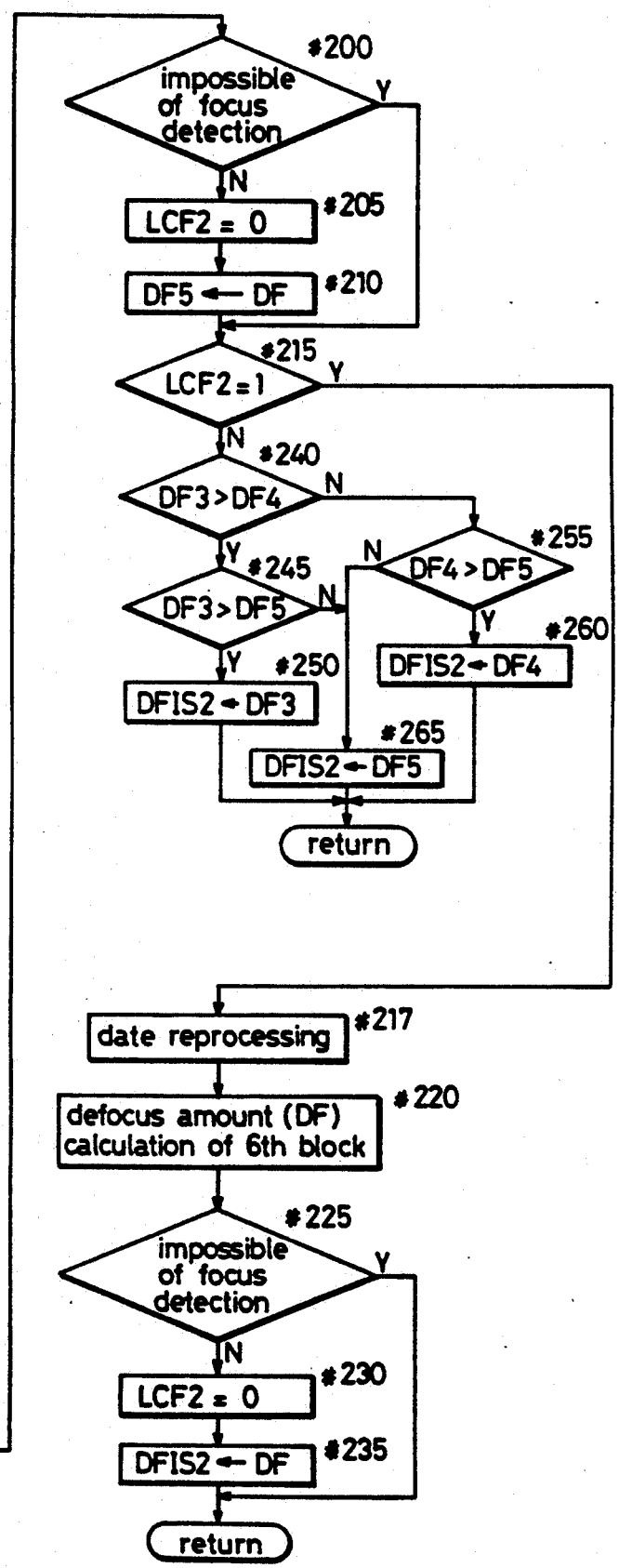

Next, the microcomputer μC enters a subroutine of FIG. 11 for calculating the defocus amount of the second island (#57). In FIG. 11, firstly as variable DF3 to DF6 storing the defocus amounts of the third to the sixth blocks, a predetermined value −K is set, and the LC flag LCF2 indicating impossibility of focus detection of the second island is set (#130 to #150). The detection of the focus conditions of the third, the fourth and the fifth blocks is carried out (#155 to 210). Since the detail is the same with that of the first and the second blocks, the description is omitted. At step #215, whether the focus detection of the third to the fifth blocks are all impossible or not is judged by the setting condition of the LC flag LCF2. When the LC flag LCF2 is set, the program advances to step #217 and when not set, the program advances to step #240.

At step #240, the microcomputer μC judges the largeness or smallness of the defocus amounts of the third to the fifth blocks to decide the largest one to be the defocus amount DFIS2 of the second island (#240 to #265) and the program returns.

On the other hand, at step 217, the microcomputer μC reprocesses the fourth finite-differential data into an eighth finite-differential data in order to make possible the focus detection of an object of a low frequency. In concrete, if the data of the picture elements are $l_1, l_2, \ldots, l_n \ldots$, the fourth finite-differential data are stored as $dD_n = l_1 - l_5, \ldots, l_5 - l_9, \ldots, l_n - l_{n+4}, \ldots$. The eighth finite-differential data are $dD_m' = l_1 - l_9, \ldots, l_m - l_{m+8}$, which are obtained by taking every fourth one of the sum of the stored fourth finite-differential data $dD_n$. In other words, the every eighth finite-differential data are $dD_m' = (dD_1 + dD_5), \ldots, (dD_m + dD_{m+4}), \ldots, = (l_1 - l_5 + l_5 - l_9), \ldots, (l_{n-4} - l_n + l_n - l_{n+4}), \ldots, (l_m - l_{m+8})$, where $n = m + 4$.

Using such a new finite-differential data $dD_m'$, the detection of the focus condition and the defocus amount calculation of the sixth block is carried out. When the focus detection is possible, the LC flag LCF2 is reset and the defocus amount DF6 of the sixth block is regarded as the defocus amount DFIS2 of the second island and the program returns. When the focus detection is impossible, the program immediately returns.

Figure 12:
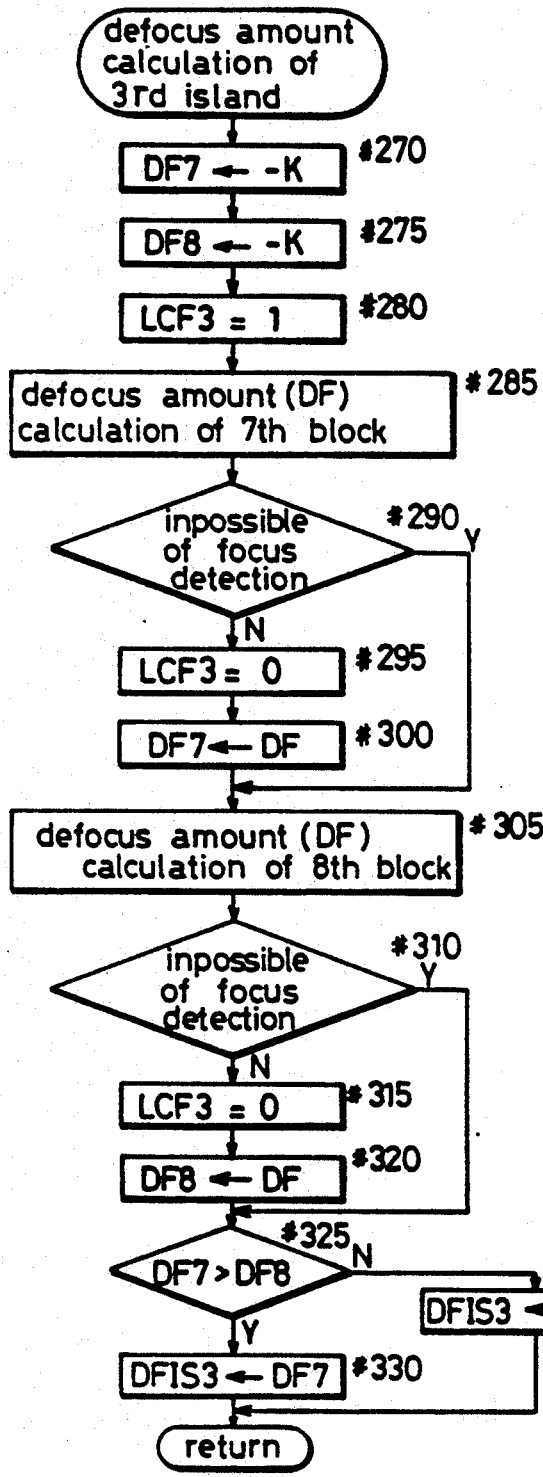

Then, the microcomputer enters a subroutine of FIG. 12 for the detection of the focus condition and the defocus amount calculation of the third island (#58), but this is the same as the case of the first island and the discription thereof is omitted (#270 to #335). The defocus amounts are calculated relating to the seventh and eighth blocks, and variables DF7, DF8, are used for storing the blocks respectively, a flag LCF3 used for indicating the imposibility of the focus detection of the third island, and a variable DFIS3 for storing the defocus amount of the third island.

Figure 13:
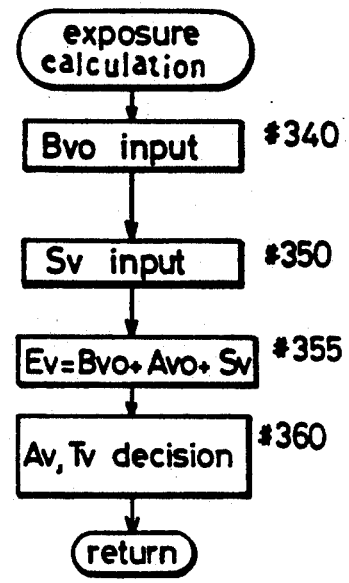

A subroutine of FIG. 13 for the exposure calculation of step #35 shown in FIG. 8 is now described. The microcomputer μC feeds the brightness detecting circuit LMC with a signal directing the output of the brightness data, and receives an open brightness value Bvo of a light passed through the lens (#340). Similarly, the microcomputer μC receives a film speed Sv from the film speed reading circuit ISO (#350). At the abovementioned step 15, the full-aperature diaphragm aperture value Avo is preliminarily received from the lens circuit LEC. The exposure value Ev is calculated from the received data using the formula Ev=-Bvo+Avo+Sv, and the controlled diaphragm aperture value Av and the shutter speed Tv are decided according to predetermined calculating systems and the program returns (#355, #360).

A subroutine of step #45 shown in FIG. 8 is shown in FIGS. 14 to 19, and in this subroutine, the distribution of the object is known from the obtained defocus amount of the islands respectively and divided into patterns, and the most suitable algorithm for each pattern is selected to obtain the most suitable defocus amount.

Relating to the distribution of the objects, first it is to be judged from the difference of the defocus amounts between the two islands whether the objects of the two islands are of a group or of different groups. Further, it is judged whether the objects of a group are close to each other or a little apart. The difference of the defocus amounts between the two islands and the distribution of the objects are shown in Table 1. In this table, the defocus amount (the predetermined value a) for judging whether the objects are close to each other or a little apart is changed with F Number for the lens control, which is because the in-focus area changes with the depth of field and has no immediate relation with the pattern of the object.

TABLE 1

| classification of distribution of object of two island | objects of a group | | objects of different group |
|---|---|---|---|
| | close | a little apart | |
| F No. of lens | | | |
| F2.8 or more | within 100 μm | 101~400 μm | more than 401 μm |
| less than F2.8 | within 200 μm | 201~400 μm | |

TABLE 2

| f | f ≧ 50 mm | f < 50 mm | treatment of distance detecting algorithm |
|---|---|---|---|
| image magnification | | | |
| high magnification area | more than 1/15 | 1/15 or more | giving first priority to center of distance detecting area |
| middle magnification area | 1/15~1/100 | less than 1/15 | giving priority to center of distance distribution |
| low magnification area | less than 1/100 | — | giving priority to close side of distance distribution |

Further, when the focus detection of the object of the second island is possible, the image magnification of the second island is calculated based on the defocus amount of this island, the focal length data of the lens, and the object distance data, and the algorithm for detecting the defocus amount also changed with the obtained image magnification. Basically, when the image magnification is high, the main object is considered to be necessarily in the center of a scene to be photographed and therefore priority is given to the second island. With a middle image magnification, since a plurality of persons or the like are in such a picture and the distance distribution is considered not to be so much scattered, priority is given to the center of the distance distribution. Further, with a low image magnification, since a background is often included in the picture and the distance distribution is considered to be much scattered, priority is given to the close side of the distance distribution.

Values used as the basis for judging the image magnitude and the treatment of the distance detecting algorithm are shown in Table 2. Here, when the focal length f is less than 50 mm and the image magnification is less than 1/15, priority is given to the center of the distance distribution in all of the algorithms. This is because as the focal length becomes shorter, the depth of field becomes greater and therefore, the objects detected on the remaining islands can be rather sufficiently covered by adjusting the focus on the center of the distance distribution. However this table is only for showing a method of thinking and the detail is partly different, which will be described later.

Figure 14:
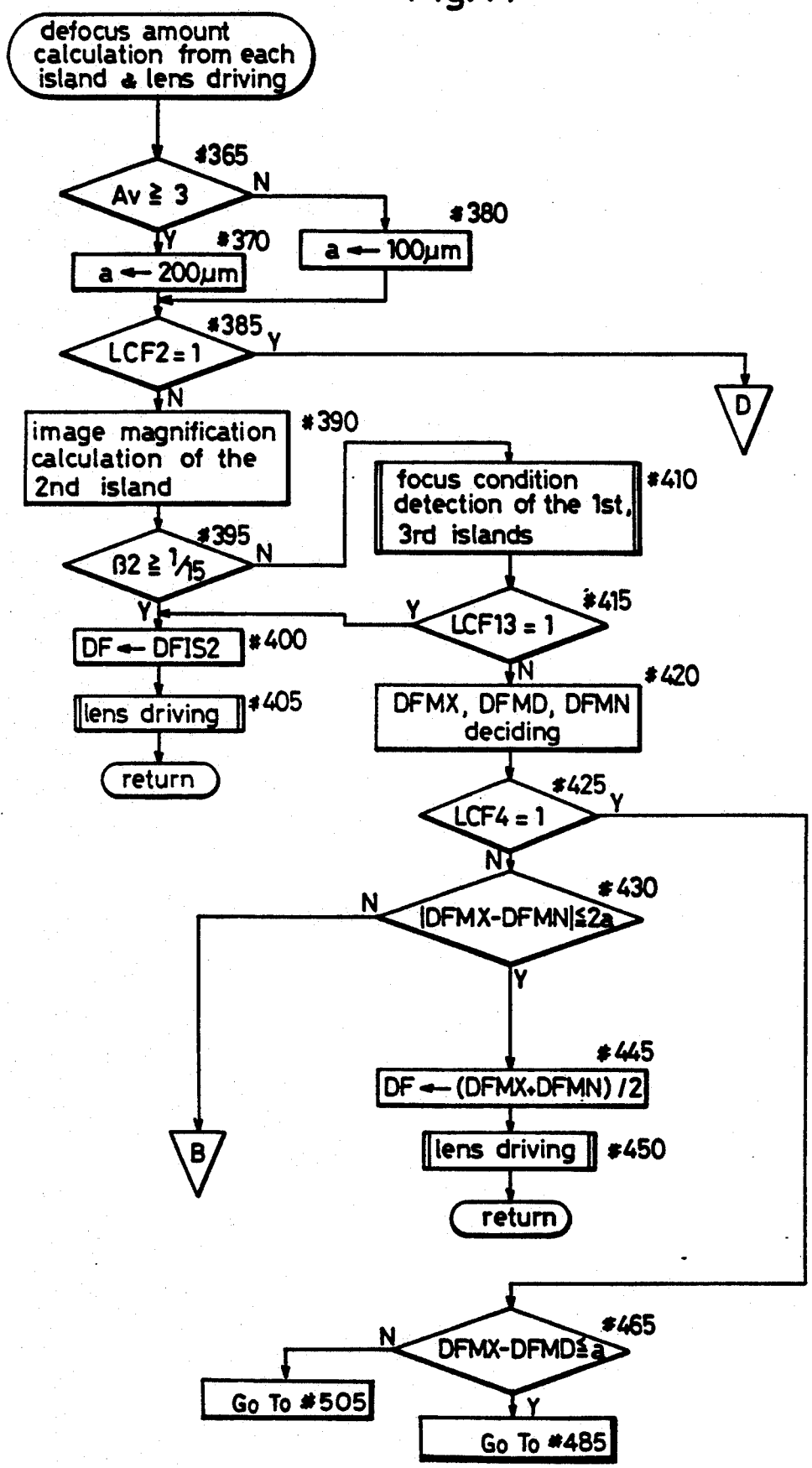

A flow chart for carrying out the abovementioned operation (a subroutine of step #45 shown in FIG. 8) is shown in FIG. 14 and will be now described. First, the microcomputer μC judges whether the control stop value Av is more than 3 (FNo. is more than 8) or not. When it is more than 3, the defocus range (predetermined value a) for regarding close is set to be 0 μm and when less than 3 it is set to be 100 μm and the program advances to step #385 (#365#~#380). At step #385, whether the focus detection of the second island is impossible or not is judged by whether the LC flag LCF2 is set or not. When the focus detection is impossible (LCF2=1), the program advances to step #620 which is described later. On the contrary, when the focus detection is possible (LCF2=0), the image magnification $\beta_2$ of the object in the second island is calculated in the following method (#390).

The image magnification $\beta_2$ can be determined by the following formula:

$$\beta_2 = f/x$$

(f=focal distance; x=object distance from camera).

In this formula, since the focal distance is received from the lens, the object distance x from the camera has only to be calculated to obtain the image magnification $\beta_2$. The object distance x from the camera is obtained by the following formula:

$$x = f^2 / DFx$$

(DFx=defocus amount at a film plane from ∞ position of lens to object position).

Here, since the lens is not a thin island lens but it has two principal rays on the front and the back sides of the lens and the principal rays changes with the change of the focal distance, the abovementioned formula is an approximate formula. On the other hand, the defocus amount DFo from the infinite position to the present position of the lens is stored as the rotation amount (number) of the motor in the counter indicating the present position, and the relationship is as follows:

$$N = k \cdot DFo$$

and the value of the coefficient k is received from the lens. From the abovementioned formula, the defocus amount DFo from the infinite position to the present position of the lens is:

DFo=N/k. And the defocus amount DF from the present position of the lens to the object position is obtained by the focus detection. As a result, the defocus amount DFx from the infinite position of the lens to the object position is:

$$DFx = DFo + DF.$$

From this, the object distance x is:

$$X = f^2/DFx = f^2/(N/k + DF).$$

Consequently, the image magnification $\beta_2$ can be obtained by the following formula:

$$\beta_2 = f/x = (N/k + DF)/f$$

or using the formula $\Delta N = DF \times k$ ($\Delta N$=driving amount of lens from present position of lens to object position), it can be also obtained by the formula:

$$\beta_2 = (D + \Delta N)/f \cdot k.$$

Then, it is judged whether the obtained image magnification $\beta_2$ is more than 1/15 or not. When it is more than 1/15, the defocus amount DF1S2 of the second island is regarded as the defocus amount DF for driving the lens, and the lens is driven based on this, and the program returns (#395~#405). A subroutine for driving the lens will be described later.

When the image magnification is less than 1/15, the focus condition of the first and the third islands are detected (#410). This subroutine will now be described with reference to FIG. 18.

First, the flag LCF13 indicating that the focus detection of both the first and the third islands is impossible and the flag LCF4 indicating that the focus detection of one of these islands is impossible are reset (#2000, #2005). Then, it is judged whether the flags LCF1, LCF3 indicating the impossibility of the focus detection of the first and the third island respectively are set or not. When both of them are judged to be set, the flag LCF13 is set (#2010, #2015, #2020), and when one of them is judged to be set, the flag LCF4 is set (#2010, #2015, #2030, #2025). And further when neither is set, both of the flags LCF13, LCF4 are not set (#2010, #2030) and the program returns respectively.

Returning to FIG. 14, in step #415, it is judged whether the flag LCF13 indicating the impossibility of the focus detection of both of the first and the third islands is set or not. When it is set, it is considered that the focus detection only of the second island was carried out and the program advances to step #400, where the lens is driven based on the defocus amount of the second island. When the flag LCF13 is not set, the maximum defocus amount DFMX i.e. the defocus amount of an object most apart from the camera, the minimum defocus amount DFMN i.e. the defocus amount of an object closest to the camera and the middle defocus amount are decided (#420). Then, it is judged whether the flag LCF4 indicating the impossibility of the focus detection of one of the first and the third islands is set or not (#425). When it is set, that is, when the focus detection of one island is impossible, the program advanced to step 465, which will be described later. When the flag LCF4 is not set, that is, when the focus detection of all the islands is possible, the program advances to step 430.

Now, supposing such object distance distributions as shown in FIGS. 21a to 21h, defocus amount deciding algorithms suitable for these distance distributions respectively will be described. In FIGS. 21a to 21h, numerals ①②③ indicate the object detected in the first, the second and the third islands respectively, and the positions of the objects ① and ③ are exchangeable.

Figure 15:
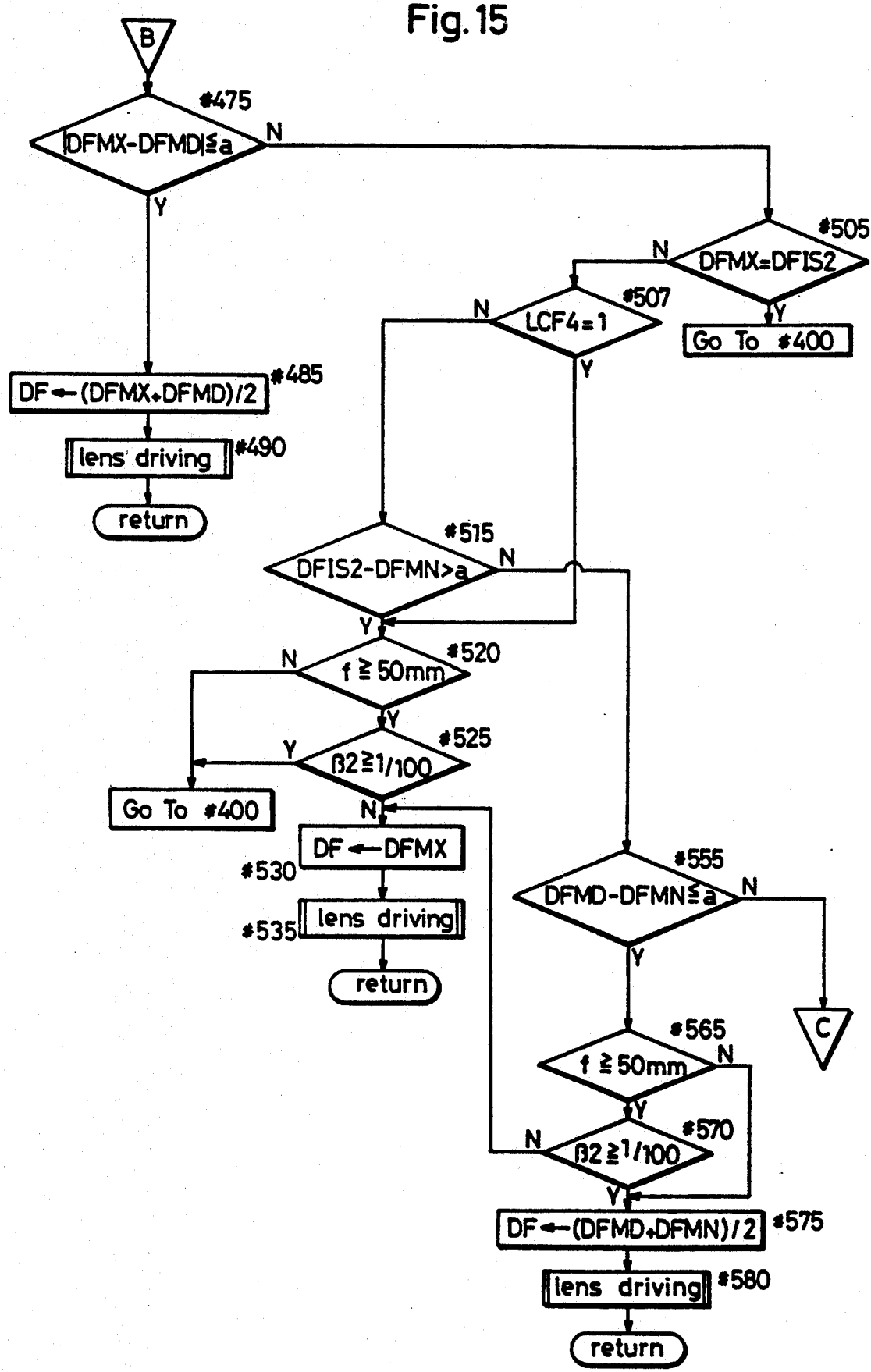

(a) When the deviation of three defocus amounts is within 2a (see FIG. 21a):

When the deviation of the defocus amounts of three islands is within 2a (a: a predetermined value), the mean value of the maxmum defocus amount DFMX and the minimum defocus amount DFMN is regarded as the defocus amount DF, and the lens is driven in accordance with this defocus amount DF (#430 to #450). This is because, in this defocus amount range, irrespective of the image magnification, the objects in the position of the maximum and the minimum defocus amounts repectively can be substantially in in-focus by using the defocus amount DF which is the mean value of the maximum defocus amount DFMX and the minimum defocus amount DFMN, though somewhat varying with the diaphragm aperture value and the focal length. At step #430, when the deviation of the defocus amounts of three islands is not within 2a, the program advances to step #475 (FIG. 15).

(b) When the deviation of two defocus amounts is within a (see FIG. 21b):

At step 425, when the flag LCF4 is set, the focus detection of one of the first and the third islands is impossible, and the program advance to step #465. At #465, it is judged whether the deviation of the defocus amounts DFMX, DFMD of the two focus detectable islands is within a, and when it is within a, the program advances to step #485 (FIG. 15). Then, the mean value of these two defocus amounts DFMX, DFMD is obtained and the lens is driven based on this defocus amount DF (#490). Here, the defocus amount of the focus undetectable island is −K and this value is the minimum defocus amount DFMN. When the object condition is not as abovementioned, the program advances to step #50.

(c) When only the most distant object is far (see FIG. 21c):

At step 475, the deviation of the defocus amount DFMX of the nearest object and the defocus amount DFMD of the middle object is within a, the program advances to step #485. At step 485, the mean value of the defocus amount DFMX of the nearest object and the defocus amount DFMD of the middle object is regarded as the defocus amount DF and the lens is driven based on the defocus amount DF, and the program returns (#475 to #490). As a scene including such objects, for example, a scene can be supposed where the main object including several persons is at the near position but it is one-sided in the scene or the center of the scene is vacant, and one island is looking at a distant object.

(c) When the object in the center of the scene is nerest (see FIG. 21d):

When the object condition is not such a one as mentioned in (a), (b) or (c) above, and at the same time the object of the second island is nearest to the camera, the lens is driven based on the defocus amount DFIS2 of the second island. In the embodiment, it is judged at step #505 whether the defocus amount DFIS2 of the second island is maximum or not, and when it is maximum the program advances to step #400 and the lens is driven based on the defocus amount DFIS2 of the second island.

Figure 21A:
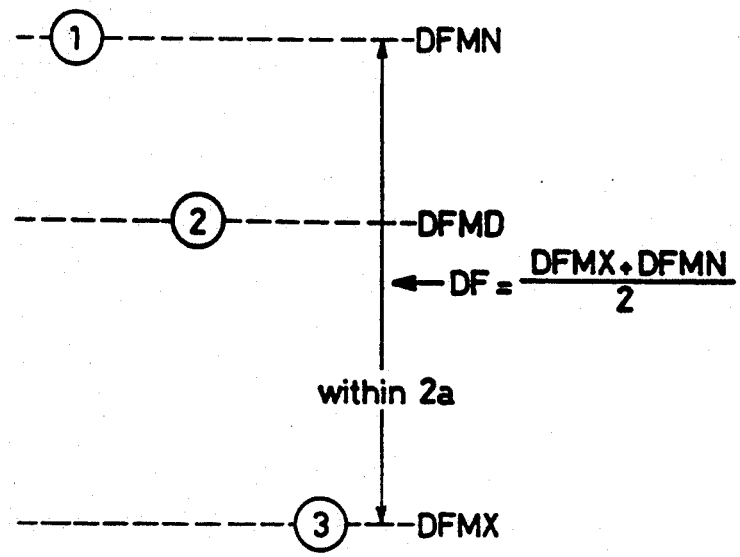
FIGS. 21a to 21h are explanatory views showing distribution of object distances detected by the automatic focus adjusting device of FIG. 2.
Figure 21A:
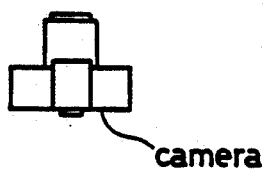
Figure 21B:
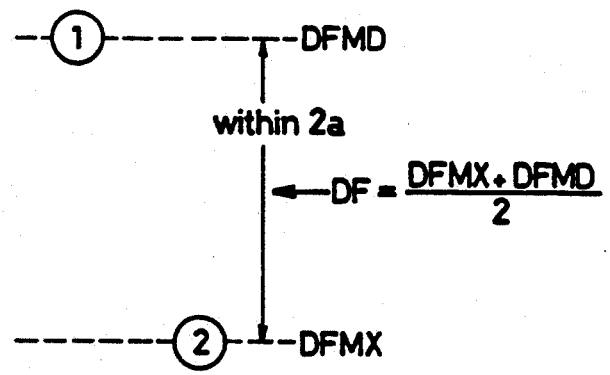
Figure 21B:
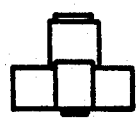
Figure 21C:
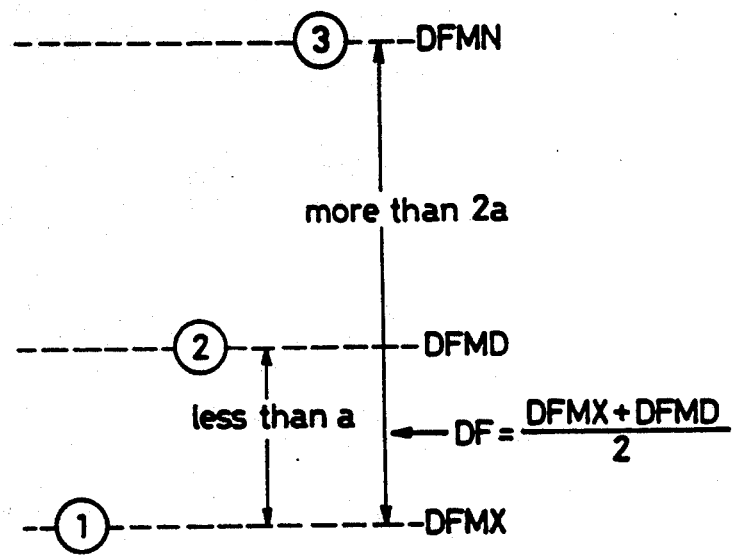
Figure 21C:
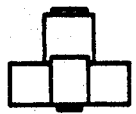
Figure 21D:
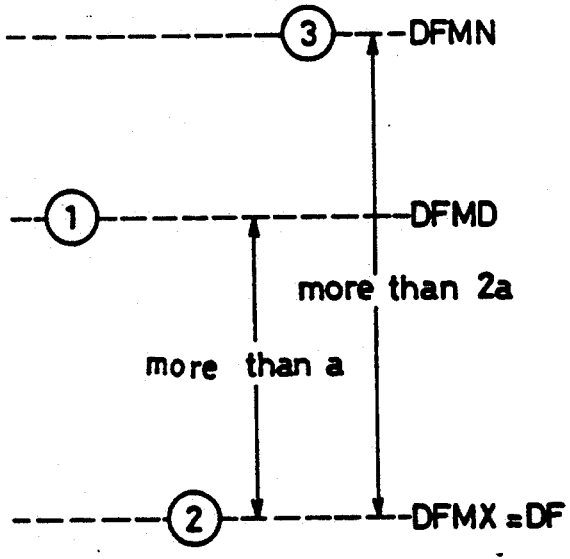
Figure 21D:
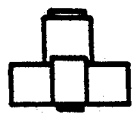
Figure 21E:
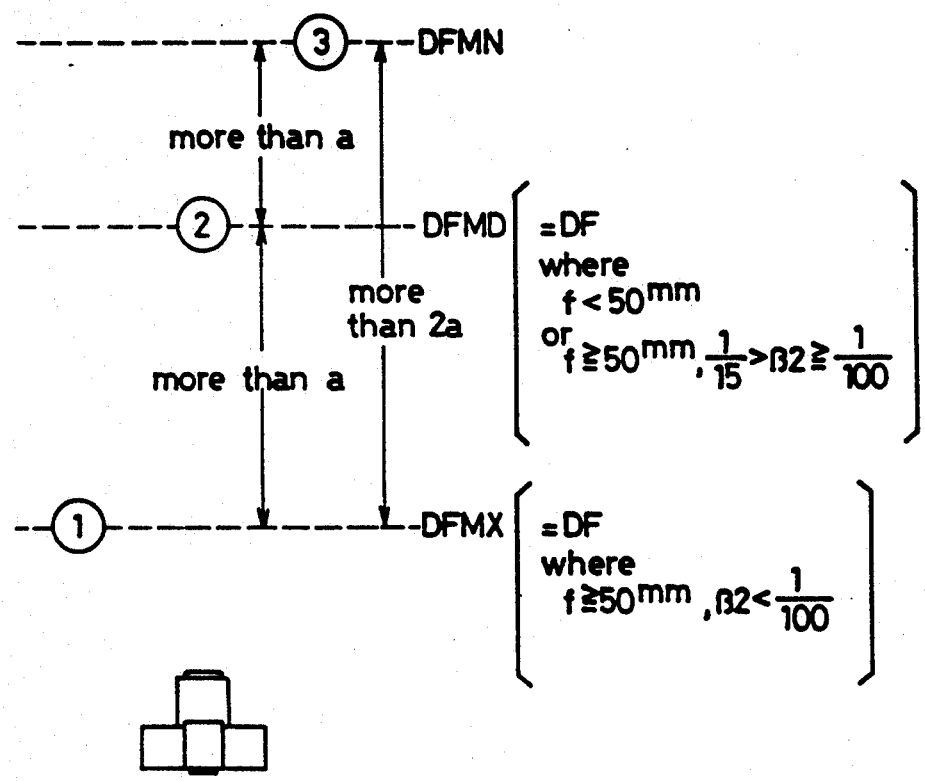
Figure 21F:
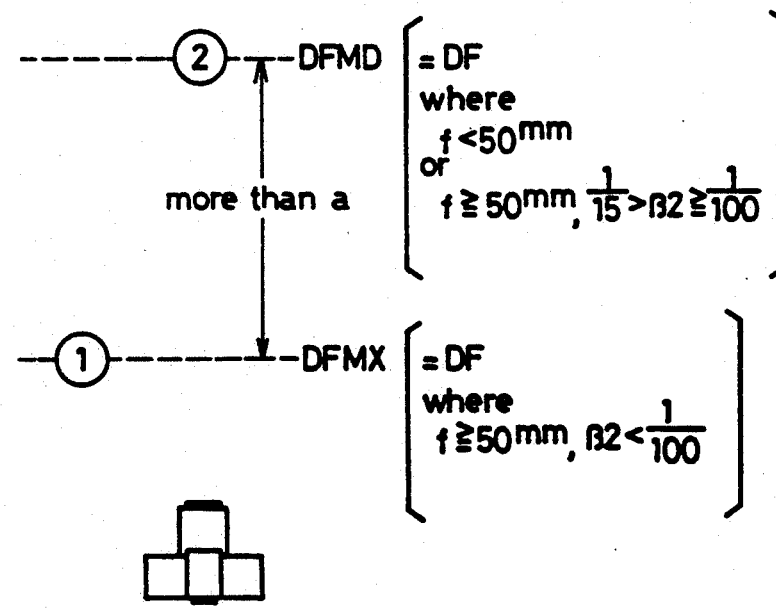

(e) When the focus detection of all the island is possible and the object of the second island is the center of the distance distribution and any object the distance distribution of which is before or behind the center is not near to the object of the second island (see FIG. 21e): and (f) When the focus detection of one of the first island and the third island is impossible and the object of the second island is distant from the camera, and at the same time any object of the focus detectable island is not near to the object of the second island (see FIG. 21f).

In these two cases, the defocus amount deciding algorithm changes with the focal length f and the image magnification $\beta_2$ of the center of the scene.

(i) When the focal length of the lens is short (f < 50 mm), priority is given to the second island, irrespective of the image magnification. This is because the probability of the presence of the main object in the second island (in the center of the scene) is high and since the field depth of a lens of a short focal length is deep, even the object including distant and near objects can be in-focus in another island at a high probability.

(ii) When the focal length of the lens is long (f ≥ 50 mm), the image magnification is calculated.

When the image magnification is high (1/15 > $\beta_2$ ≥ 1/100), a scene where a person(s) is the main object is supposed and probably the image is rather large and present in the center of the scene. Therefore, priority is given to the object of the second island.

On the contrary, when the image magnification is low (1 < $\beta_2$ < 100), the scene including a background as an object is supposed, and in this case the main object is often near to the camera. Therefore, priority is given to the object of the island of the maximum defocus amount DFMX.

The abovementioned matters are explained with reference to the flow chart. At step #507, whether the focus detection of one of the first and the second islands is impossible or not is judged by the fact of the flag LCF4 being set or not. When it is set, the deviation of the maximum defocus amount DFMX and the minimum defocus amount DFMN is judged to be more than the predetermined value a (#475, #505). Therefore, it is judged that the object of the second island is more apart from the camera than the objects of other islands and other objects are not near to the object of the second island, and the program advances to step #520.

On the contrary, when the flag LCF4 is not set, the focus detection of the entire island is possible and at step #515, it is judged whether the deviation of the defocus amount DFIS2 of the second island and the minimum defocus amount DFMN is more than the predetermined value a or not. When it is more than a, it is judged that the object of the second island is the center of the distance distribution and any object the distance distribution of which is before or behind the center is not in the neighborhood of the object of the second island, and the program advances to step #520. When it is not more than a, the program advances to step 555.

At step #520, whether the focal length f is more than 50 mm or not is judged and at step #525 whether the image magnification $\beta_2$ of the second island is more than 1/100 or not is judged. When the focal length f is less than 50 mm or the image magnification $\beta_2$ is more than 1/100, the program advances to step #400, and the lens is driven based on the defocus amount of the second island. When the focal length f is more than 50 mm and the image magnification $\beta_2$ is less than 1/100, the program advances to step 530. And the maximum defocus amount DFMX is regarded as the lens driving defocus amount DF thereby to drive the lens (#530, #535), and the program returns.

Figure 21G:
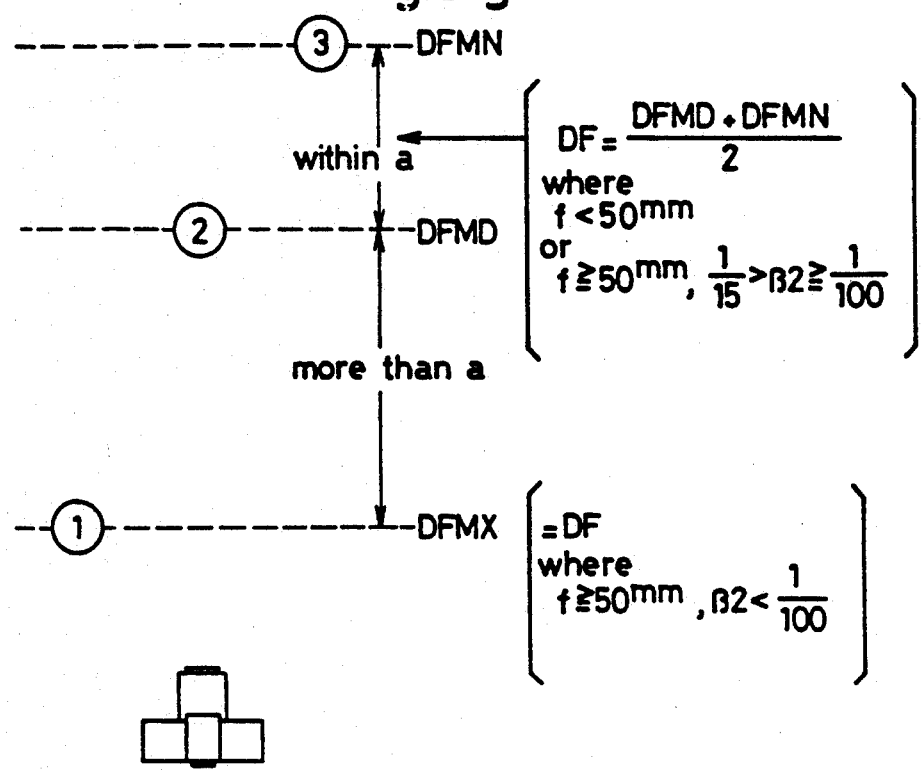

Next, relating to the distance distribution of the object, (g) a case is supposed where the object of the first or the third island (for example, the object ① is the nearest and the object ② of the second island is not in the neighborhood of the nearest object ① and at the same time the object ③ of the island other than the object of the second island and the object ① of the island nearest to the second island is in the neighborhood of the object ② of the second island (see FIG. 21g).

Taking of the defocus amount DF in such a case, if the lens is either of a short focal length (f < 50 mm) or of a long focal length (f ≥ 50 mm), when the image magnification $\beta_2$ is in the range of 1/15 > $\beta$ ≥ 1/100, the mean value of the defocus amount DFIS2 of the second island and the defocus amount near to the second island is regarded as the defocus amount DF for driving the lens. This is because when the image magnification is rather high (1/15 > $\beta_2$ ≥ 1/100), the object is often a person present in the center of the scene (the second island), and sometimes the object is a plurality of persons present in the neighborhood of the center of the scene (the second island). Further, it is supposed that another object such as a signboard or desk (see the object ① in FIG. 21g) is present close to the camera side, and it is the object of the maximum defocus amount (the nearest object), but this maximum defocus amount is not suitable for the lens driving defocus amount and is neglected. When the lens is of a short focal length (f < 50 mm), it is supposed that a landscape including rather the whole of the scene is photographed. And in this case, the focus is adjusted on the object, including the object of the second island, on the side apart from the camera and in this neighborhood. Further, when the lens is of a long focal length (f ≥ 50 mm) and the image magnification $\beta_2$ of the second island is less than 1/100, the focus is adjusted on the nearest object. Generally when a lens of a long focal length is used, often a main object (a specified object such as a person or an animal) is decided, and in such a case the main object is supposed to be nearest to the camera and other objects are regarded as the background.

Figure 16:
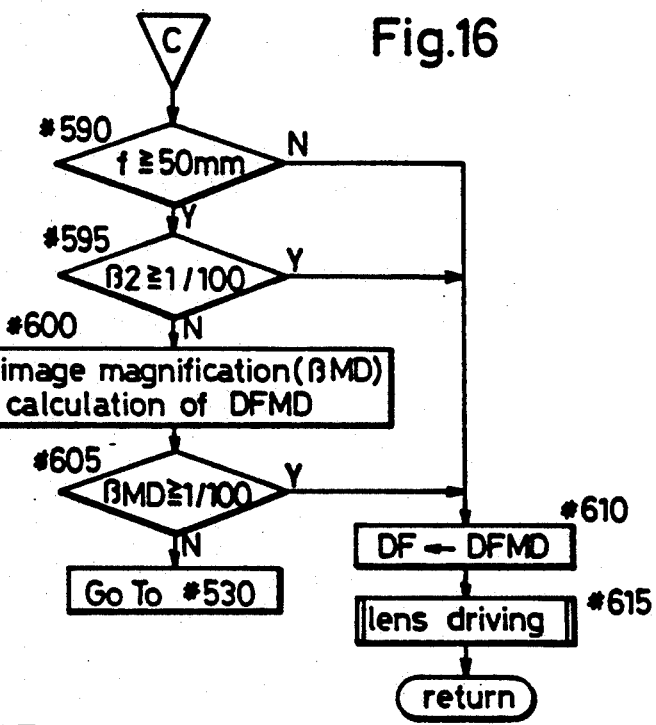
Figure 17:
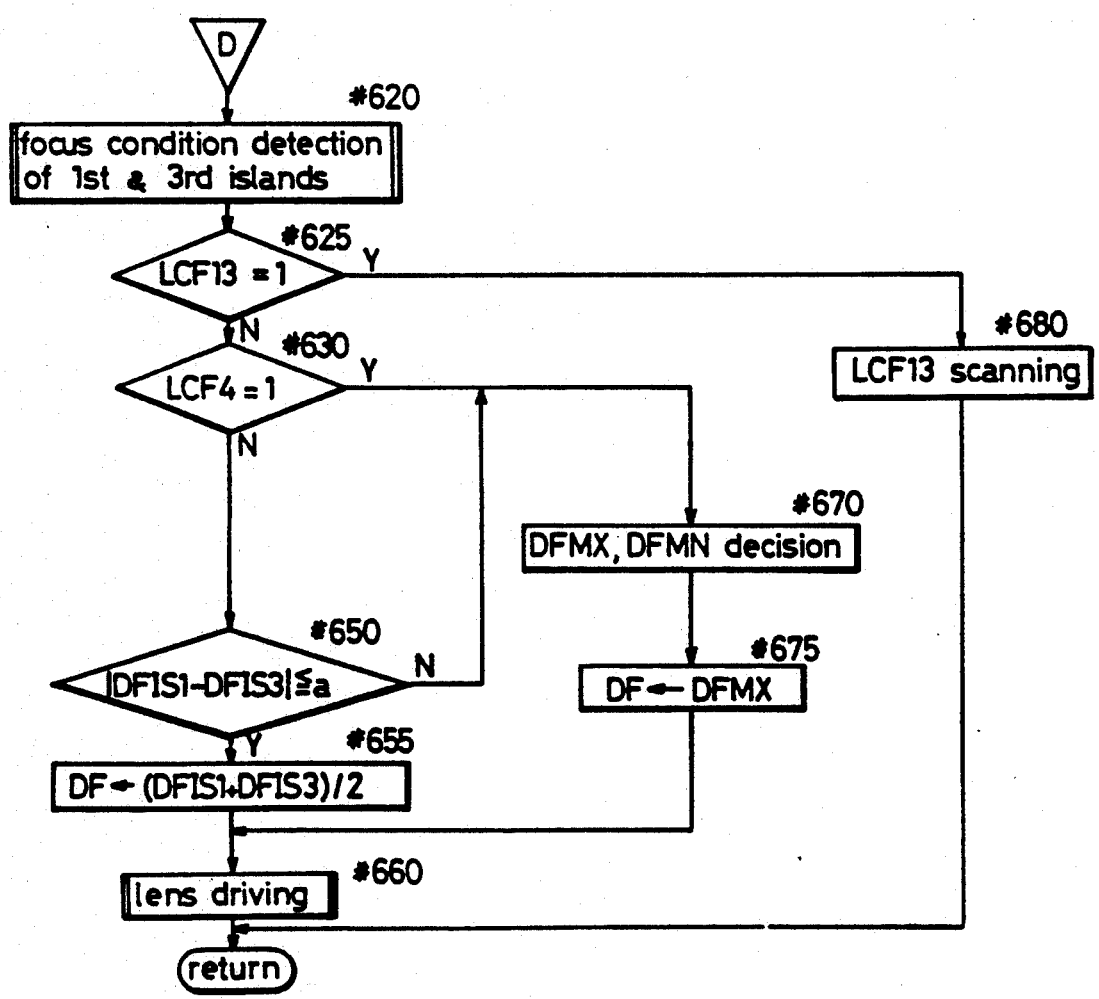
Figure 18:
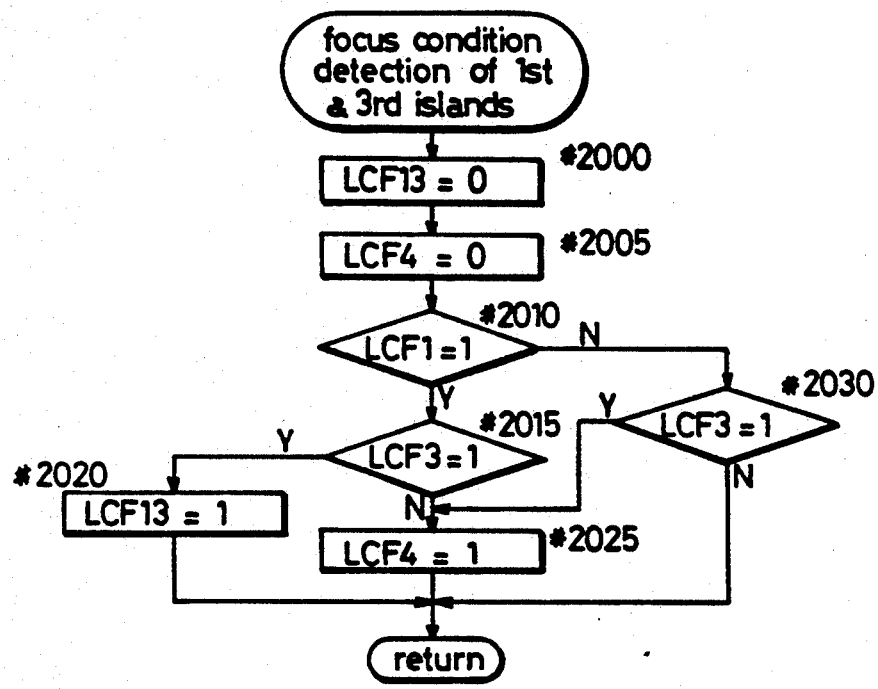

The abovementioned description will be now explained with reference to the flow chart of FIG. 15. When the deviation of the maximum defocus amount DFMX and the middle defocus amount DFMD is more than the predetermined value a (#475), the defocus amount DFIS2 of the second island not being the maximum defocus amount DFMX (#505), the deviation of the middle defocus amount DFMD and the minimum defocus amount DFMN is within the predetermined value a (#555), this case corresponds to the abovementioned object distance distribution and the program advances to step #565. In other cases than this, the program advances to step #590 (FIG. 16).

At step #565, it is judged whether the focal length is more than 50 mm or not, and when it is less than 50 mm, program advances to step 575. Then, the mean value of the middle defocus amount DFMD and the minimum defocus amount DFMN is obtained as the lens driving defocus amount to drive the lens based on this and the program returns (#575, #580). When the focal length f is more than 50 mm, it is judged whether the image magnification $\beta_2$ of the second island is more than 1/100 or not (#570). And when it is more than 1/100, the program advances to step #575, and the abovementioned adjustment is carried out. When the image magnification $\beta_2$ is less than 1/100, the program advances to step #530 to adjust the focus on the object of the maximum defocus amount DFMX.

Figure 21H:
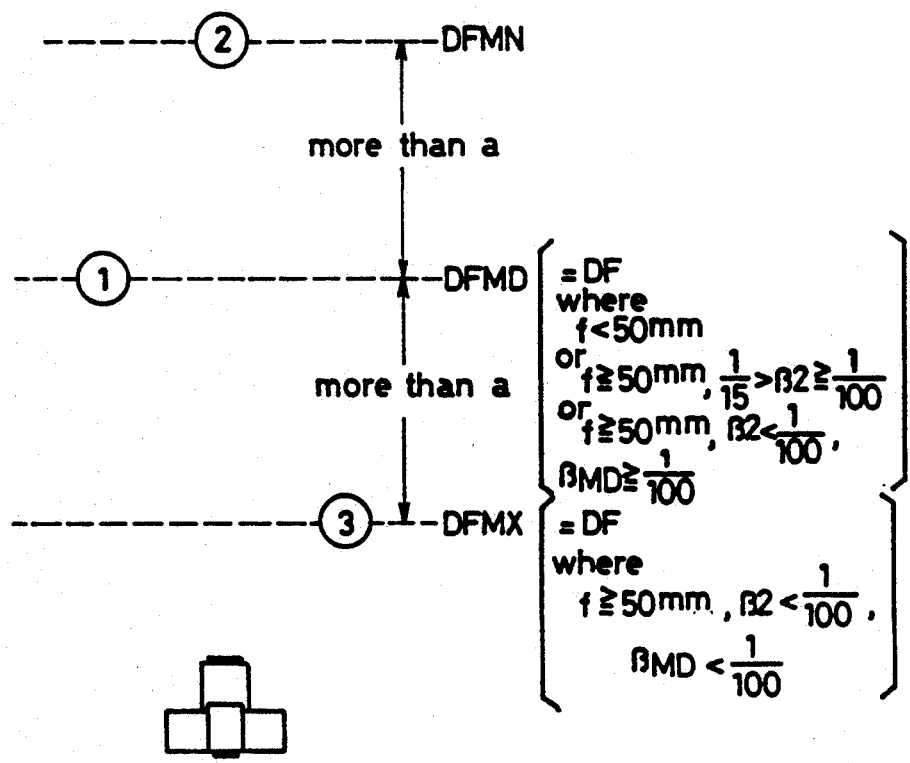

Lastly, (h) a case is supposed where the objects of the three islands are not close to each other and the object of the second island is apart from the camera (see FIG. 21h).

In this case, with a lens of a short focal length (f<50 mm), the middle defocus amount DFMD is regarded as the lens driving defocus amount DF and in accordance with the field depth, the focus is also adjusted on the objects of the defocus amounts DFMX, DFMN before and behind the middle defocus amount. With a lens of a long focal length (f≧50 mm), when the image magnification $\beta_2$ is in the range of $1/15 > \beta_2 \geq 1/100$, often a specified main object (not the background) is photographed and the object of the middle defocus amount DFMD is the main object, and this middle defocus amount DFMD is regarded as the lens driving defocus amount DF. When the image magnification $\beta_2$ of the second island is less than 1/100, the object of the second island is regarded as not the main object but the background, and the middle image magnification $\beta_{MD}$ is calculated. When the middle magnification $\beta_{MD}$ is less than 1/100, the object of the middle defocus amount DFMD is also regarded as not the main object and the defocus amount DFMX of the island in which the nearest object is present is regarded as the lens driving defocus amount DF. Further, when the middle image magnification $\beta_{MD}$ is more than 1/100, the main object often present in the island of this middle defocus amount DFMD, this middle defocus amount DFMD is regarded as the lens driving defocus amount DF.

The abovementioned description will be now explained with reference to the flow chart of FIG. 16. It is judged whether the focal length f of the lens is more than 50 mm or not and whether the image magnification $\beta_2$ 2 of the second island is more than 1/100 or not (#590, #595). When the focal length f is less than 50 mm and the image magnification $\beta_2$ is more than 1/100, the program advances to step #610, the middle defocus DFMD is substituted in the lens driving defocus amount DF thereby to drive the lens and the program returns (#610, #615). When the focal length is more than 50 mm and the image magnification is less than 1/100, the image magnification $\beta_{MD}$ of the middle defocus amount DFMD is calculated by the formula $\beta_{MD} = (N/k + DFMD)/f$, it is judged whether image magnification $\beta_{MD}$ is more than 1/100 or not (#600, #605). When the image magnification $\beta_{MD}$ is more than 1/100, the program advances to step #610, where the lens is driven based on the middle defocus amount DFMD. When the image magnification is less than 1/100, the program advances to step #530, and the lens is driven based on the maximum defocus amount DFMX.

The defocus amount for driving a lens is decided on the object distribution including the image magnification as abovementioned, which depends upon the result of taking numerous pictures, obtaining a large amount of data and statistically treating the data.

Now, such an algorithm as is used when the focus detection of the second island is impossible will be described in the following. In the flow chart, the program advances from step #385 of FIG. 14 to step #620 of FIG. 17. At step #620, subroutine (FIG. 18) of detecting the focus conditions of the first and the third islands is carried out to detect the focus conditions respectively and the program advances to step #625, where it is judged whether the first and the third islands are both in LC state or not. When these islands are both in LC state (LCF13=1) the program advances to step #680, where an adjustment is carried out for seeking focus detectable area with driving the lens (which is called LC scanning, but being not so important to the subject of the present invention, the description is omitted) and the program returns. When the focus detection of at least one of the two islands is possible, that is, when the flag LCF13 is not set, the program advances to step #630, it is judged whether the focus detection of only one island is impossible or not. When the focus detection of both of the two islands is possible, that is, when the flag LCF4 is not set, the program advances to step #650, where the absolute value of the deviation of the defocus amounts DFIS1, DFIS3 is whithin the predetermined value a. When within a, two objects are considered as being near to each other, and the mean value of the two defocus amounts is regarded as the lens driving defocus amount DF, thereby to drive the lens, then the program returning (#650, #655, #660). At step #630, when the flag LCF4 is set, that is, when the focus detection of only one of the first and third islands is possible, or at step #650 when the absolute value of the deviation of the defocus amounts of the two islands is more than a, the program advances to stop 670. Then which defocus amount is larger is judged and the larger one is regarded as the lens driving defocus amount DF (#675), thereby driving the lens, and the program returns. The larger defocus amount at step #670 means the defocus amount of the focus detectable island in the routine coming from step #630 and the defocus amount of the object nearer to the camera in the routine coming from step #650.

Figure 19:
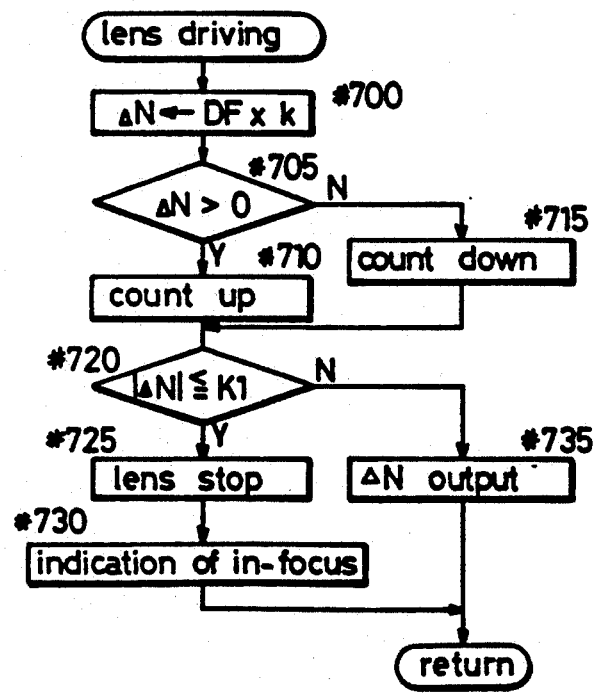

Now, the flow chart for the lens driving shown in FIG. 19. is explained.

By multiplying the obtained defocus amount DF by a coefficient K for converting the defocus amount DF to the driving amount of a motor, the rotation mumber ($\Delta N$) of the motor is obtained (#700). Then, it is judged whether the rotation number ($\Delta N$) is plus or minus (#705). When it is plus, it is the rear-focus state and the lens is adjusted to be outwardly driven, so that a counting-up signal is fed to the counter indicating the rotation number (amount) of the motor from the infinite position. When it is not plus, the lens is to be inwardly driven, and a counting-down signal is fed (#710, #715). Then, it is judged whether the absolute value $|\Delta N|$ of the rotation number is within a predetermined value K1 (K1 is the value indicating the in-focus range). When it is within K, it is judged to be the in-focus state, and a lens stop signal is fed to the lens control circuit LECON to let the display circuit DISP make in-focus display, the program returning (#720 to #730). On the contrary, when the absolute value $|\Delta N|$ of the rotation number is more than K1, $\Delta N$ indicating the rotation number of the motor is fed to the lens control circuit LECON and the program returns (#735). The lens control circuit LECON receives the rotation number $\Delta N$, and rotates or reverses the motor in accordance with the plus or minus sign, and control the driving amount of the motor based on its absolute value $|\Delta N|$. Now, another example of the way of finding a camera distance necessary in obtaining an image magnification will be described.

Relating to the outward driving amount $DF_0$ from the infinite position to the present position, the camera distance d and the focal length f, the following approximate formula can be abtained.

$$d = f^2/DF_0$$

Here, the value N of the puls counter monitoring the lens from the inwardly driven condition to the terminal position and to the outwardly driven condition to the present position is generally proportional to the outward driving amount $DF_0$, and the following formula is obtained.

$$N = k \times DF_0$$

(k = a constant)

From this formula, relating to the camera distance at the present position of the lens, the following formula is obtained.

$$d = F^2 k/N$$

Taking logarithms of both sides of the abovementioned formula:

$$\log_2 d = \log_2 f^2 k - \log_2 N$$

$$\log_2 d^2 = Dv\infty - 2\log_2 N$$

$$(Dv\infty = 2\log_2 f^2 k)$$

According to APEX system, relating to the camera distance, $$Dv = \log_2 d^2$$

consequently, the formula $$Dv = Dv\infty - 2\log_2 N \ldots (*)$$

is obtained.

Nowadays, computing of camera data is carried out according to the APEX system.

By obtaining $Dv\infty$ as a data characteristic of a lens by the formula (*) according to the APEX system, and converting the pulse number N for outwardly driving the lens in the APEX system thus to compute, the camera distance Dv can be obtained according to the APEX system.

The way of converting the number N for outwardly driving the lens to the APEX system will be now described in the following. First, $\log^2 N = Dv_N/2$ is calculated. As apparent from this formula, when N = 1, that is, when the lens is outwardly driving by one pluse, $Dv_N/2 = 0$. From the formula (*), the distance Dv at this time is $Dv\infty$.

When the pulse number N for outwardly driving the lens is more than 2, the number of figure N of the bit $b_N$ where | is standing counted from the maximum bit of the abovementioned counter is considered to be an integral number value N, the lower four figures subsequent thereto being considered to be decimal positions having the weights of ½, ¼, ⅛, 1/16 respectively, the further lower figures being neglected. For example, if. $.. b_9 b_8 b_7 b_6 b_5 ... = ... 10111$ (bits more than $b_{10}$ is 0), (9 + 7/16). And if ... $b_{12} b_{11} b_{10} b_9 b_8 ... = ... 11010$... (bit more than $b_{13}$ is 0), (12 + 10/16), and this value is deemed to be $\log_2 N$. Then, by multiplying this value by 2, $2\log_2 N$ is obtained. In the abovementioned example, by multiplying $(9 + 7/16)$ by 2, $(18 + 7/8)$ is obtained, and similarly multiplying $(12 + 10/16)$ by 2, $(24 + 10/8) = 25 + 2/8)$ is obtained. Then Dv can be obtained by formula (*) $Dv = Dv\infty - 2\log_2 N$. In this case, the value Dv has a small error (0.1 Dv), but it can be neglected. Taking of the value $Dv\infty$, when the pulse number for outwardly driving the lens is 2, that is, when 1 is standing on bit, the value $Dv\infty$ can be obtained by adding 2 to the value Vv corresponding to the distance where the lens is in the in-focus state.

The value Dv obtained as abovementioned is a data of the camera distance d relative to the present lens position.

Relative to the present lens position, the distance x to an object having a defocus amount DF is obtained as follows. N being the value of the counter indicating the present lens position, the value $\Delta N$ indicating the driving amount of the lens is obtained by the formula $\Delta N = k \times DF$. Then, $N = N + \Delta N$ is substituted in the abovementioned formula. Thus, relating to the camera distance at the object position of the lens (which is the object distance), $$X = f^2 k/(N + \Delta N)$$

Taking logarithms of both sides of the formula, $$\log_2 X = \log_2 f^2 k - \log_2 (N + \Delta N)$$

$$Dv = Dv\infty - 2\log_2 (N + \Delta N)$$

$$(Dv = \log_2 X^2, Dv\infty = 2\log_2 f^2 k)$$

Relating to the image magnification $\beta$ at the object position, $$\beta = f/x$$

and from this, $$\log_2 \beta = \log_2 f - \log_2 x$$

$$2 \log_2 \beta = 2 \log_2 f - Dv$$

Consequently, the focal length data can be stored as $2 \log_2 f$ or $\log_2 f$ of the APEX system, while the image magnification $\beta$ is stored in ROM table as the value relative to $(2 \log_2 f - Dv)$.

What is claimed is:

1. An automatic focus adjusting device comprising:
   object distance detecting means for detecting object distance;
   a plurality of optical means corresponding to a plurality of areas in a scene, respectively, and for focus detection;
   light receiving means having a plurality of light receiving portions provided corresponding to said plurality of optical means respectively, to produce light receiving data of each area;
   focus adjusting data calculating means for calculating data relating to focus adjustment of each area in accordance with the light receiving data to produce focus adjusting data of each area; and
   focus adjusting data deciding means for deciding a second focus adjusting data to be focus adjusted based on the object distance and the focus adjusting data.

2. An automatic focus adjusting device as claimed in claim 1, wherein said focus adjusting data calculating means has a plurality of focus detecting means for detecting a focus condition of each area to obtain a defocus amount of each area and calculating the focus adjusting data based on the focus condition of each area.

3. An automatic focus adjusting device as claimed in claim 1, further comprising:
   focal length outputting means for outputting focal length data, wherein the focus adjusting data deciding means for deciding a second focus adjusting data to be adjusted based on the object distance, the focal length data and the focus adjusting data.

4. An automatic focus adjusting device comprising:
   object distance detecting means for detecting object distance;
   a plurality of optical means corresponding to a plurality of areas in a scene, respectively, and for focus detection;
   light receiving means having a plurality of light receiving portions provided corresponding to said plurality of optical means respectively, to produce light receiving data of each area;
   focus adjusting data calculating means having a plurality of calculating means each of which calculates focus adjusting data of each area based on the corresponding light receiving data; and
   focus adjusting data selecting means for selecting a calculating means from said plurality of calculating means based on the object distance and the focus adjusting data.

5. An automatic focus adjusting device comprising:
   a plurality of optical means corresponding to a plurality of areas in a scene, respectively, and for focus detection;
   light receiving means having a plurality of light receiving portions provided corresponding to said plurality of optical means respectively, to produce light receiving data of each area;
   focus adjusting data calculating means for calculating data relating to focus adjustment of each area in accordance with the light receiving data to produce focus adjusting data of each area;
   difference calculating means for calculating difference between two focus adjusting data among the focus adjusting data; and
   focus adjusting data deciding means for deciding a second focus adjusting data to be focus adjusted based on the calculated difference and the focus adjusting data.

6. An automatic focus adjusting device as claimed in claim 5, wherein said focus adjusting data calculating means has a plurality of focus detecting means for detecting a focus condition of each area to obtain a defocus amount of each area and calculating the focus adjusting data based on the focus condition of each area.

7. An automatic focus adjusting device as claimed in claim 5, wherein said two focus adjusting data include a maximum focus adjusting data and another focus adjusting data.

8. An automatic focus adjusting device as claimed in claim 5, wherein said two focus adjusting data include a minimum focus adjusting data and another focus adjusting data.

9. An automatic focus adjusting device comprising:
   a plurality of optical means corresponding to a plurality of areas in a scene, respectively, and for focus detection;
   light receiving means having a plurality of light receiving portions provided corresponding to said plurality of optical means respectively, to produce light receiving data of each area;
   focus adjusting data calculating means having a plurality of calculating means each of which calculates focus adjusting data of each area based on the corresponding light receiving data;
   difference calculating means for calculating differences between two focus adjusting data among the focus adjusting data; and
   selecting means for selecting a calculating means from said plurality of calculating means based on the calculated difference and the focus adjusting data.

10. An automatic focus adjusting device comprising:
    a plurality of optical means corresponding to a plurality of objects in a scene, and for focus detection;
    light receiving means having a plurality of light receiving portions provided corresponding to said plurality of optical means respectively, to produce light receiving data of each object;
    focus adjusting data calculating means for calculating focus adjusting data to each object calculated from the light receiving data; and
    focus adjusting data selecting means for selecting one of the focus adjusting data based on the relative positions of the objects along the optical axis and positional data of the optical means corresponding to each object.

11. An automatic focus adjusting device as claimed in claim 10, wherein the positional relation of the optical axis is obtained from the focus adjusting data.

12. An automatic focus adjusting device comprising:
    a plurality of optical means corresponding to a plurality of objects in a scene, and for focus detection;
    light receiving means having a plurality of light receiving portions provided corresponding to said plurality of optical means respectively, to produce light receiving data of each object;

focus adjusting data calculating means for calculating focus adjusting data to each object calculated from the light receiving data;

focus adjusting data selecting means for selecting focus adjusting data based on the relative positions of the objects along the optical axis and positional data of the optical means corresponding to each object; and focus adjusting data deciding means for deciding a second focus adjusting data based on the selected focus adjusting data.

* * * * *